United States Patent
Akimoto et al.

(10) Patent No.: US 9,323,999 B2
(45) Date of Patent: Apr. 26, 2016

(54) IMAGE RECOGNITION DEVICE, IMAGE RECOGNITION METHOD, AND IMAGE RECOGNITION PROGRAM

(71) Applicant: Honda elesys Co., Ltd., Yokohama-shi, Kanagawa-ken (JP)

(72) Inventors: Hiroyuki Akimoto, Yokohama (JP); Junji Kanamoto, Yokohama (JP)

(73) Assignee: Honda Elesys Co., Ltd., Kanagawa (JP)

( * ) Notice: Subject to any disclaimer, the term of this patent is extended or adjusted under 35 U.S.C. 154(b) by 239 days.

(21) Appl. No.: 13/761,705

(22) Filed: Feb. 7, 2013

(65) Prior Publication Data

US 2013/0279746 A1    Oct. 24, 2013

(30) Foreign Application Priority Data

Feb. 9, 2012   (JP) .................. 2012-025874

(51) Int. Cl.
G06K 9/00   (2006.01)
G06K 9/32   (2006.01)
G06K 9/46   (2006.01)

(52) U.S. Cl.
CPC ............ *G06K 9/3241* (2013.01); *G06K 9/4614* (2013.01); *G06K 2209/23* (2013.01)

(58) Field of Classification Search
None
See application file for complete search history.

(56) References Cited

U.S. PATENT DOCUMENTS

| | | | |
|---|---|---|---|
| 6,950,550 B1* | 9/2005 | Sumi et al. | 382/154 |
| 2010/0086176 A1* | 4/2010 | Yokono | G06K 9/00369 382/103 |
| 2010/0296706 A1* | 11/2010 | Kaneda | G06K 9/00281 382/118 |
| 2011/0255743 A1* | 10/2011 | Guan | G06K 9/00818 382/103 |
| 2012/0051592 A1* | 3/2012 | Yashiro | 382/103 |
| 2013/0279745 A1* | 10/2013 | Mitsui et al. | 382/103 |
| 2013/0287251 A1* | 10/2013 | Mitsui et al. | 382/103 |

FOREIGN PATENT DOCUMENTS

| | | |
|---|---|---|
| JP | 2007-310805 A | 11/2007 |
| JP | 2011-146017 A | 11/2007 |
| ZW | WO2013031096   * | 3/2013 |

OTHER PUBLICATIONS

David A. Forsyth et al., "Computer Vision: A Modern Approach", Prentice Hall, 2002, Aug. 14, 2002.
M. Okutomi et al., Digital Image Processing, Association of CG-ARTS, pp. 252-267, Jul. 22, 2004.
Yamaguchi et al., "Obstacle Detection in Road Scene using Monocular Camera", 2005-CVIM-151 (10),Nov. 18, 2005, pp. 69-76.

* cited by examiner

*Primary Examiner* — Nancy Bitar
(74) *Attorney, Agent, or Firm* — Keating & Bennett, LLP

(57) ABSTRACT

An image recognition device includes an image acquiring unit configured to acquire an image, and an object recognition unit configured to extract feature points from the image acquired by the image acquiring unit, to detect coordinates of the extracted feature points in a three-dimensional spatial coordinate system, and to determine a raster scan region which is used to recognize a target object based on the detection result.

1 Claim, 16 Drawing Sheets

FIG. 3
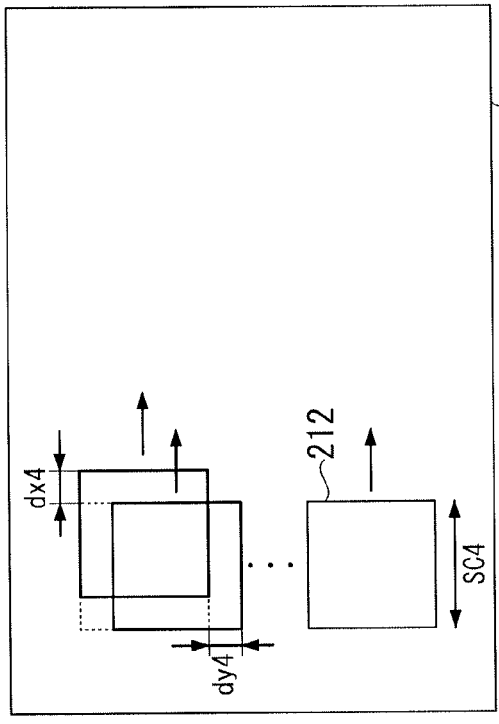
(B) SCALE 4 (SC4), MOVING STEP 4 (dx4, dy4)
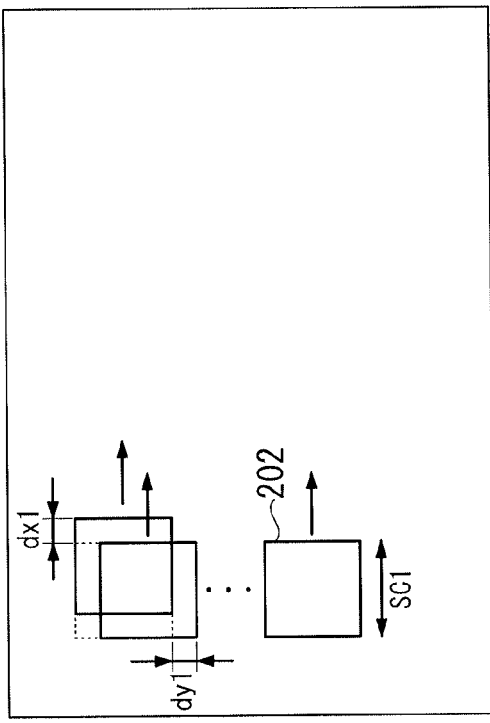
(A) SCALE 1 (SC1), MOVING STEP 1 (dx1, dy1)

FIG. 8
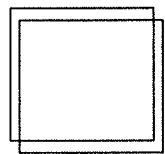
(A)
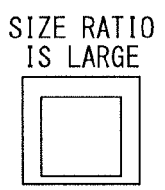
(B) SIZE RATIO IS LARGE
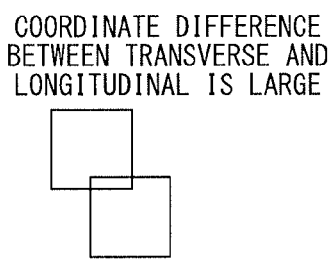
(C) COORDINATE DIFFERENCE BETWEEN TRANSVERSE AND LONGITUDINAL IS LARGE
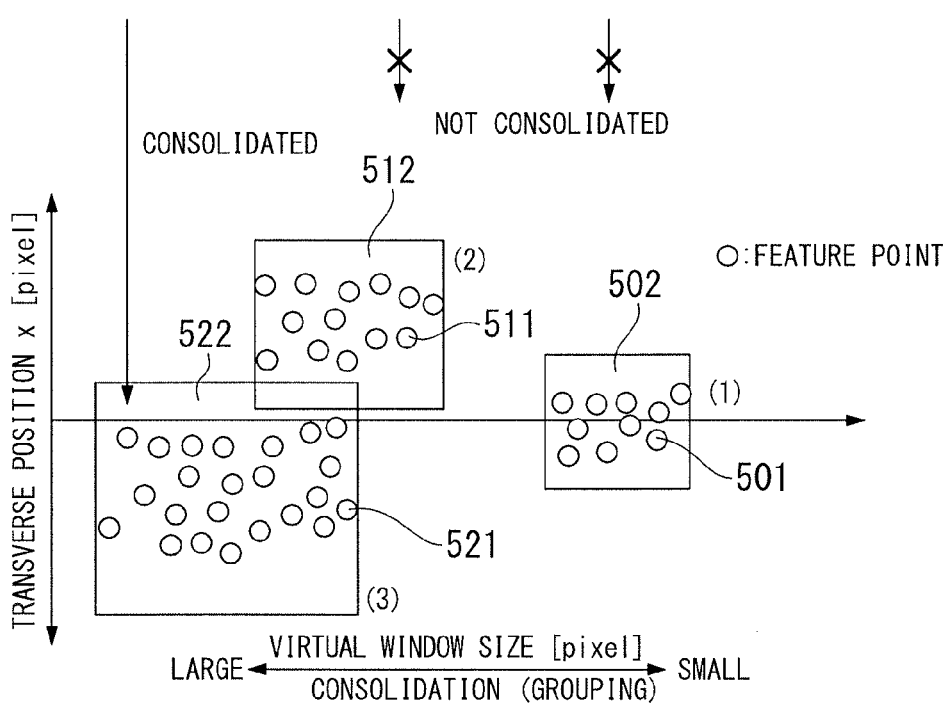

FIG. 15
(A)
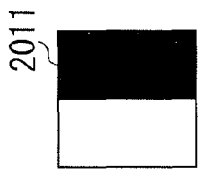
TWO-RECTANGLE FEATURE
(DIFFERENCE OF LEFT AND RIGHT RECTANGLES)
(B) INTEGRAL IMAGE
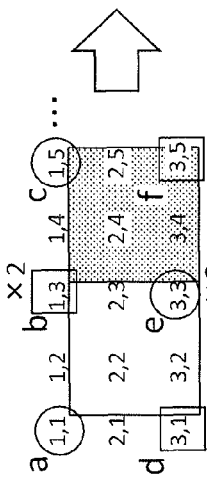
REGION 1
e+a−(b+d)
REGION 2
f+b−(c+e)
DIFFERENCE VALUE
e+a−(b+d)−(f+b−(c+e))
=a+2e+c−2b−f−d
SINGLE-RECTANGLE FEATURE
(CAN BE CALCULATED AT 4 POINTS)
SINGLE-RECTANGLE FEATURE
(CAN BE CALCULATED AT 4 POINTS)
TWO-RECTANGLE FEATURE
(CAN BE CALCULATED AT 6 POINTS)

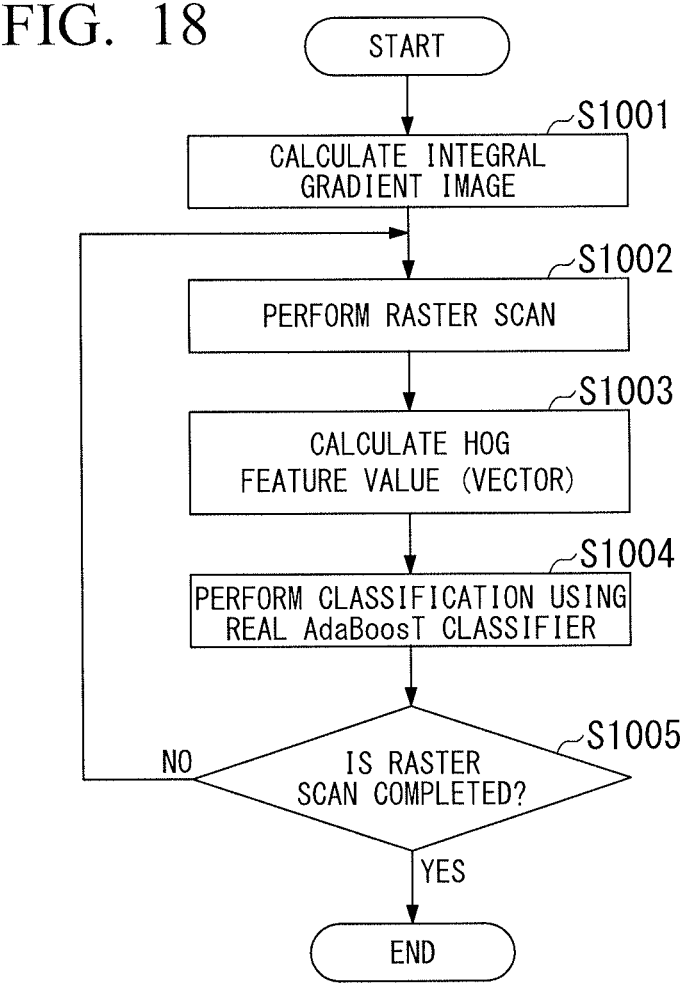

IMAGE RECOGNITION DEVICE, IMAGE RECOGNITION METHOD, AND IMAGE RECOGNITION PROGRAM

CROSS REFERENCE TO RELATED APPLICATIONS

Priority is claimed on Japanese Patent Application No. 2012-025874, filed on Feb. 9, 2012, the contents of which are entirely incorporated herein by reference.

BACKGROUND OF THE INVENTION

1. Field of the Invention

The present invention relates to an image recognition device, an image recognition method, and an image recognition program.

2. Background Art

Recently, an adaptive cruise control (ACC) system, a forward collision warning (FCW) system, a pedestrian collision warning system, and the like have been developed as a driving support system or a preventive safety system of a vehicle. The distribution of low-cost systems using an on-board camera is expected.

Pattern recognition has been often used for recognition of an object using an on-board camera (for example, see Japanese Unexamined Patent Application, First Publication No. 2007-310805 (Patent Document 1)).

An object recognition algorithm using the pattern recognition is constructed by combining classifiers of AdaBoost, SVM (Support Vector Machine), or the like with feature values of Haar-like, HOG (Histograms of Oriented Gradients), or the like.

In the pattern recognition, in order to extract a target object (an image of the target object) from a captured image, an image region (window) from which an object is recognized is set to various sizes and the object recognition algorithm is performed for each window.

As another approach, a method of estimating the three-dimensional structure of a traveling environment based on an on-board stereoscopic camera or monocular camera and detecting an object is also considered.

For example, when an on-board monocular camera is used, a technique (which is referred to as a 3D analysis technique in this specification) using acquired time-series images is known (for example, see Japanese Unexamined Patent Application, First Publication No. 2011-146017 (Patent Document 2)).

In the 3D analysis technique, feature points, optical flows, and the like are calculated from images (for example, an image at time t and an image at time t−1) having a time difference, the motion of a traveling vehicle is estimated, and then a target object, an obstacle, or the like is detected. Here, the pattern recognition is more advantageous in performance for recognizing a target object.

A pattern recognition process which is performed by an object recognition unit (for example, a processing unit corresponding to an object recognition unit 13 shown in FIG. 1) according to the background art will be described below with reference to FIG. 18.

FIG. 18 is a flowchart illustrating an example of a process flow which is performed by an object recognition unit according to the background art.

In this example, a recognition algorithm is constructed by HOG feature values and real AdaBoost classifiers.

First, the object recognition unit performs a process of calculating gradient directions and gradient magnitudes in all acquired intensity images and integrating the gradient magnitude of each gradient direction, and calculates an integral gradient image (integral histogram) which is a result of the integration (step S1001). Accordingly, the integral gradient images corresponding to the number of gradient directions are calculated.

Then, the object recognition unit extracts a region of the integral gradient image of each gradient direction through the raster scanning while causing a coordinate region (window) with a predetermined scale (size) to slide (step S1002).

When an integral gradient image is used, images to be raster-scanned are required by the number of gradient directions and thus the processing load thereof is heavier than when an integral image, for example, using a Haar-like feature value is raster-scanned.

In this manner, when the Haar-like feature value is used instead of the HOG feature value, the process can be completed by preparing a single integral image using a general integral intensity image instead of the integral gradient image and it is thus possible to save the processes. However, for example, only features such as an intensity difference between specific regions can be extracted and thus features for each gradient direction cannot be known.

Subsequently, the object recognition unit calculates the HOG feature value (vector) of the extracted coordinate region (window) (step S1003). Accordingly, a gradient histogram is created by cells.

Then, the object recognition unit performs classification with a real AdaBoost classifier by the use of the calculated HOG feature value (vector) and recognizes an object (an image of the object) which is previously set as a target (step S1004).

Here, the object recognition unit determines whether a series of raster scans has completed (step S1005).

Then, the object recognition unit ends the process flow when it is determined that a series of raster scans has completed.

On the other hand, when it is determined that a series of raster scans has not completed, the object recognition unit causes the window to shift (to slide) over a raster scan region and performs the process of step S1002.

In this manner, the object recognition unit causes the window to sequentially slide over the raster scan region and carries out repeated performance of the processes of step S1002 to step S1004, until a series of raster scans has completed.

In the series of raster scans, for example, the processes of causing a window with a fixed scale (size) to sequentially slide over an image region, carrying out repeated performance of the above-mentioned process, then changing the scale or the moving step (scanning step) of the window, causing the window to sequentially slide, and carrying out repeated performance of the above-mentioned process are performed a predetermined number of times. Accordingly, conversion into a feature vector is carried out.

The integral gradient image may not be used to create the gradient histogram, but the method using the integral gradient image can reduce the processing time, which is effective.

A rough example of the process flow of from the acquisition of an image to the raster scan in the object recognition process flow shown in FIG. 18 will be described below.

FIG. 2 is a diagram illustrating a rough example of the process flow from the acquisition of an image to the raster scan.

Data of an image captured by a camera (for example, corresponding to a camera 11 shown in FIG. 1) according to the background art is acquired as data of an input image 101 by an image acquiring unit according to the background art (for example, a processing unit corresponding to an image acquiring unit 12 shown in FIG. 1).

For example, a road and a preceding vehicle appear in this image.

An object recognition unit (for example, a processing unit corresponding to an object recognition unit 13 shown in FIG. 1) according to the background art calculates a gradient magnitude of each of multiple gradient directions (eight directions of direction 1 to direction 8 in this example) as shown in a gradient magnitude image 102.

Then, the object recognition unit creates an integral image of the gradient magnitude of each gradient direction as an integral gradient image 103 (the process of step S1001 shown in FIG. 18).

The object recognition unit scans a raster scan region 104 with a window (the process of step S1002 shown in FIG. 18).

In the raster scan, since it is necessary to raster-scan the integral gradient images of all the directions, the processing load increases.

The changing of a scale and the changing of a moving step (step width) of the raster scan in the process of step S1002 shown in FIG. 18 will be described below.

In the raster scan, the scanning operation is performed, for example, while changing a scale SC and moving steps dx and dy.

Part (A) and Part (B) of FIG. 3 are diagrams illustrating examples of the scale and the moving step of the raster scan.

In this example, it is assumed that there are four or more patterns of combinations of the scale and the moving step of the raster scan.

Part (A) of FIG. 3 is a diagram illustrating an example of the scale SC1 and the moving steps dx1 and dy1 of the raster scan in a first pattern.

In this example, in a raster scan region 201, a square window 202 having the length of the scale SC1 in the x axis direction as the transverse (horizontal) direction and the y axis direction as the longitudinal (vertical) direction is set to a predetermined initial position. This window 202 is made to slide in the x axis direction by the moving step dx1 and to slide in the y axis direction by the moving step dy1.

Part (B) of FIG. 3 is a diagram illustrating an example of a scale SC4 and moving steps dx4 and dy4 of the raster scan in a fourth pattern.

In this example, in a raster scan region 211, a square window 212 having the length of scale SC4 in the x axis direction as the transverse (horizontal) direction and the y axis direction as the longitudinal (vertical) direction is set to a predetermined initial position. This window 212 is made to slide in the x axis direction by the moving step dx4 and to slide in the y axis direction by the moving step dy4.

In this example, the values of the scale SC1 and the moving steps dx1 and dy1 of the raster scan in the first pattern are different from the values of the scale SC4 and the moving steps dx4 and dy4 of the raster scan in the fourth pattern.

In this example, for example, the scales SC of the raster scans in the patterns are different and the moving steps dx and dy having a magnitude proportional to the scale SC are used. In this example, the moving step dx in the x axis direction and the moving step dy in the y axis direction in each pattern are set to the same value.

In another configuration example, a window having a shape (for example, a rectangle other than a square) other than a square may be used. In this specification, a rectangle includes a square as well as a rectangle.

In another configuration example, the moving step dx in the x axis direction and the moving step dy in the y axis direction in a certain pattern may be set to different values.

SUMMARY OF THE INVENTION

However, although it depends on the number of feature values or the types of classifiers, the object recognition algorithm using the pattern recognition is generally a process requiring a relatively-long operation processing time (that is, a process having an increasing operation load).

In addition, it is necessary to raster-scan an image with a window for recognizing a target object (an image of the target object) from a captured image. Regarding the range of a raster scan, since it is necessary to scan any region having a possibility of presence of an object, the raster scan is performed on a region roughly close to the overall region of the captured image.

In order to increase the accuracy of the pattern recognition results, it is necessary to set the moving step of the raster scan or the scale of the window (for example, depending on the size of or the distance to an object) to detailed values and thus the number of windows increases.

For example, when an on-board object recognition application is performed, the number of target objects is less than 100, which depends on the types of the target objects. Accordingly, the number of windows in which no target object is present is actually larger, and, as a result, the processing time is uselessly spent for the most windows. For example, when the scanning operation is performed 10,000 times, 9,900 or more scanning operations are useless.

In this manner, since the processing time of the object recognition algorithm using pattern recognition simply increases with a multiplication relation to the number of windows to be raster-scanned, for example, it is difficult to mount (install) the processes in a personal computer (PC) or the like having a high-speed CPU (Central Processing Unit) installed therein on an on-board device or the like.

The present invention is made in consideration of the above-mentioned circumstances and an object thereof is to provide an image recognition device, an image recognition method, and an image recognition program which can improve the efficiency of image recognition.

(1) To achieve the above-mentioned object, an image recognition device according to an aspect of the present invention includes: an image acquiring unit configured to acquire an image; and an object recognition unit configured to extract feature points from the image acquired by the image acquiring unit, to detect coordinates of the extracted feature points in a three-dimensional spatial coordinate system, and to determine a raster scan region which is used to recognize a target object based on the detection result.

(2) Another aspect of the present invention provides the image recognition device according to (1), wherein the object recognition unit is configured to create virtual windows based on information on distances at the coordinates in the three-dimensional spatial coordinate system detected form the extracted feature points and information on positions other than the distances of the extracted feature points, to consolidate the created virtual windows, and to prepare a raster scan region.

(3) Another aspect of the present invention provides the image recognition device according to (2), wherein the object recognition unit is configured to determine a region of a virtual window, which is obtained as the final consolidation result of the virtual windows, as the raster scan region.

(4) Another aspect of the present invention provides the image recognition device according to (2) or (3), wherein the object recognition unit is configured to set sizes of the virtual windows based on the information on the distances in the three-dimensional spatial coordinate system detected for the extracted feature points, to set the positions of the virtual windows based on the information on the positions other than the distances of the extracted feature points, and to consolidate the virtual windows of which the sizes and the positions have been set using a predetermined conditional expression.

(5) Another aspect of the present invention provides the image recognition device according to (4), wherein the object recognition unit is configured to consolidate two virtual windows into a new virtual window when the relationship between the two virtual windows satisfies the conditions of the conditional expression at the time of consolidation of the virtual windows.

(6) Another aspect of the present invention provides the image recognition device according to any one of (2) to (5), wherein the object recognition unit is configured to determine a moving step of a raster scan based on the window width of each virtual window serving as a basis of the virtual window which is obtained as the final consolidation result of the virtual windows.

(7) Another aspect of the present invention provides the image recognition device according to any one of (2) to (6), wherein the object recognition unit is configured to determine a window scale to be used for a raster scan based on the window width of each virtual window serving as a basis of the virtual window which is obtained as the final consolidation result of the virtual windows.

(8) Another aspect of the present invention provides the image recognition device according to any one of (1) to (7), wherein the object recognition unit is configured to exclude a feature point, of which information on the height satisfies a predetermined condition, from candidates used to determine the raster scan region based on the information on heights in the three-dimensional spatial coordinate system detected from the extracted feature points.

(9) To achieve the above-mentioned object, an image recognition method according to another aspect of the present invention includes: causing an image acquiring unit to acquire an image; and causing an object recognition unit to extract feature points from the image acquired by the image acquiring unit, to detect coordinates of the extracted feature points in a three-dimensional spatial coordinate system, and to determine a raster scan region which is used to recognize a target object based on the detection result.

(10) To achieve the above-mentioned object, an image recognition program according to another aspect of the present invention causes a computer to perform: a sequence of causing an image acquiring unit to acquire an image; and a sequence of causing an object recognition unit to extract feature points from the image acquired by the image acquiring unit, to detect coordinates of the extracted feature points in a three-dimensional spatial coordinate system, and to determine a raster scan region which is used to recognize a target object based on the detection result.

As described above, according to the aspects of the present invention, it is possible to provide an image recognition device, an image recognition method, and an image recognition program which can improve the efficiency of image recognition.

Part (A) and Part (B) of FIG. 3 are diagrams illustrating examples of a scale and a moving step of a raster scan.

Figure 4:
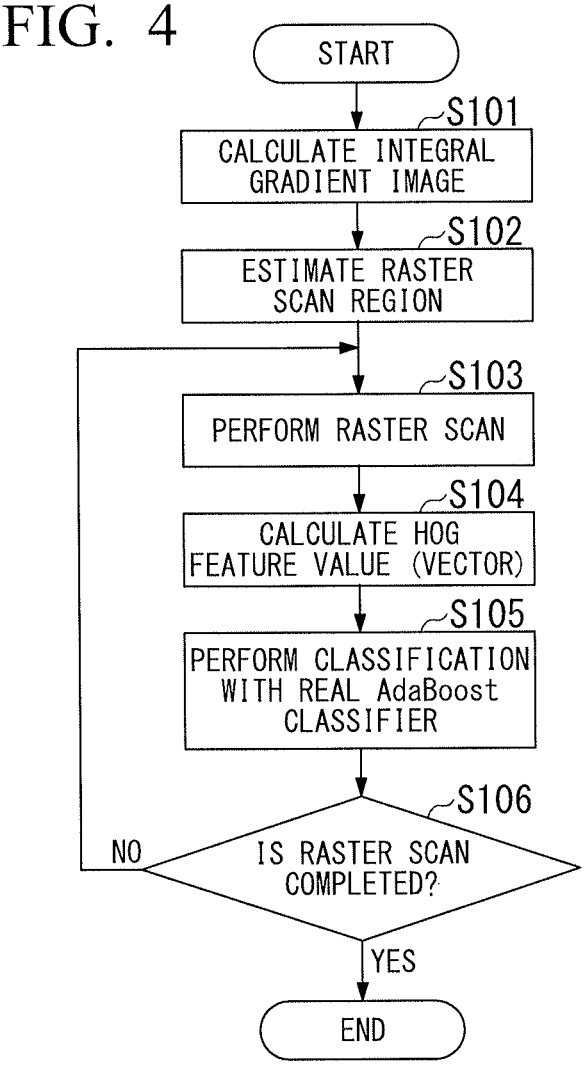

FIG. 4 is a flowchart illustrating an example of a process flow which is performed by an object recognition unit according to an embodiment of the present invention.

Figure 5:
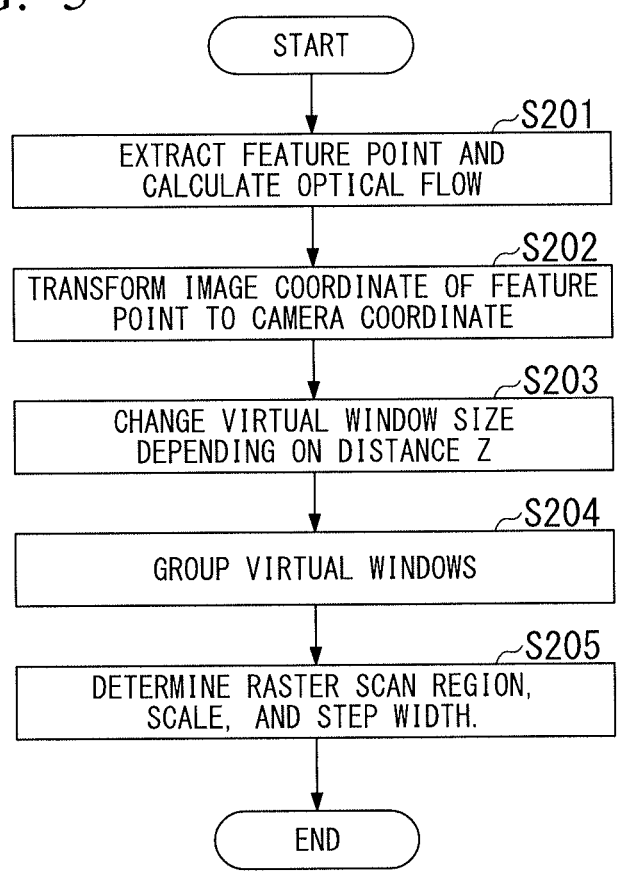

FIG. 5 is a flowchart illustrating an example of a process flow of a raster scan region estimating process which is performed by an object recognition unit according to an embodiment of the present invention.

Figure 6:
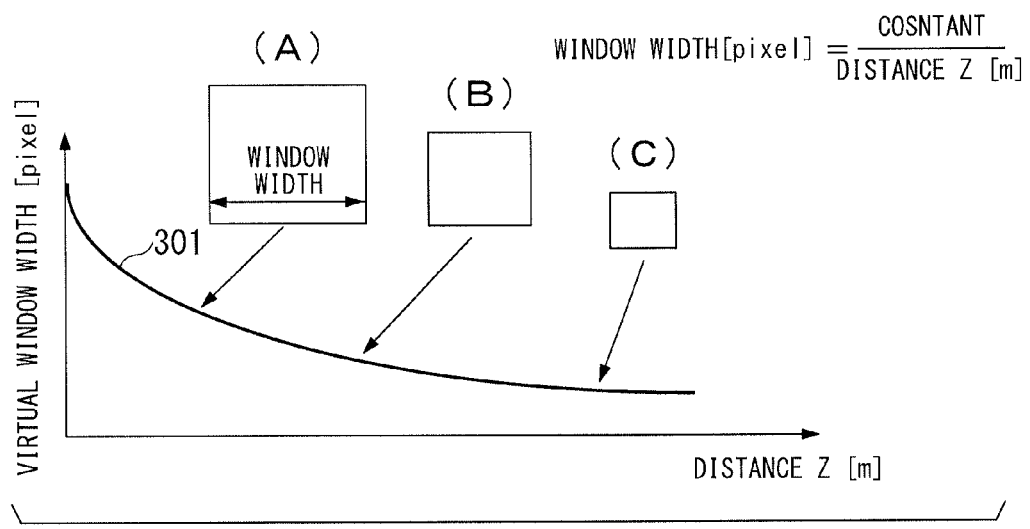

FIG. 6 is a diagram illustrating an example of a characteristic graph representing the relationship (correlation) between values of the distance Z and the widths of virtual windows at camera coordinates of feature points.

Figure 7:
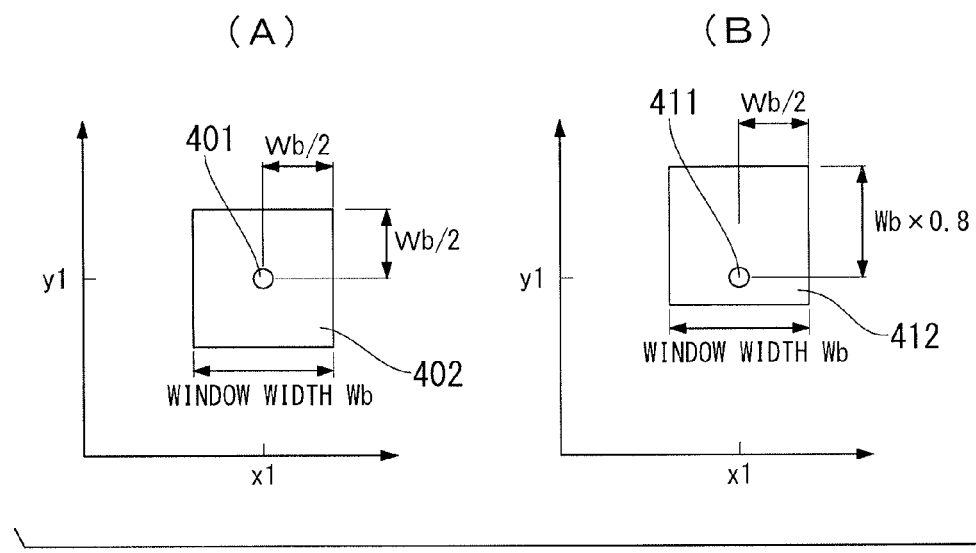

Part (A) and Part (B) of FIG. 7 are diagrams illustrating an example of the relationship between positions of feature points and positions of virtual windows.

FIG. 8 is a diagram illustrating an example of a process flow of grouping virtual windows.

Figure 9:
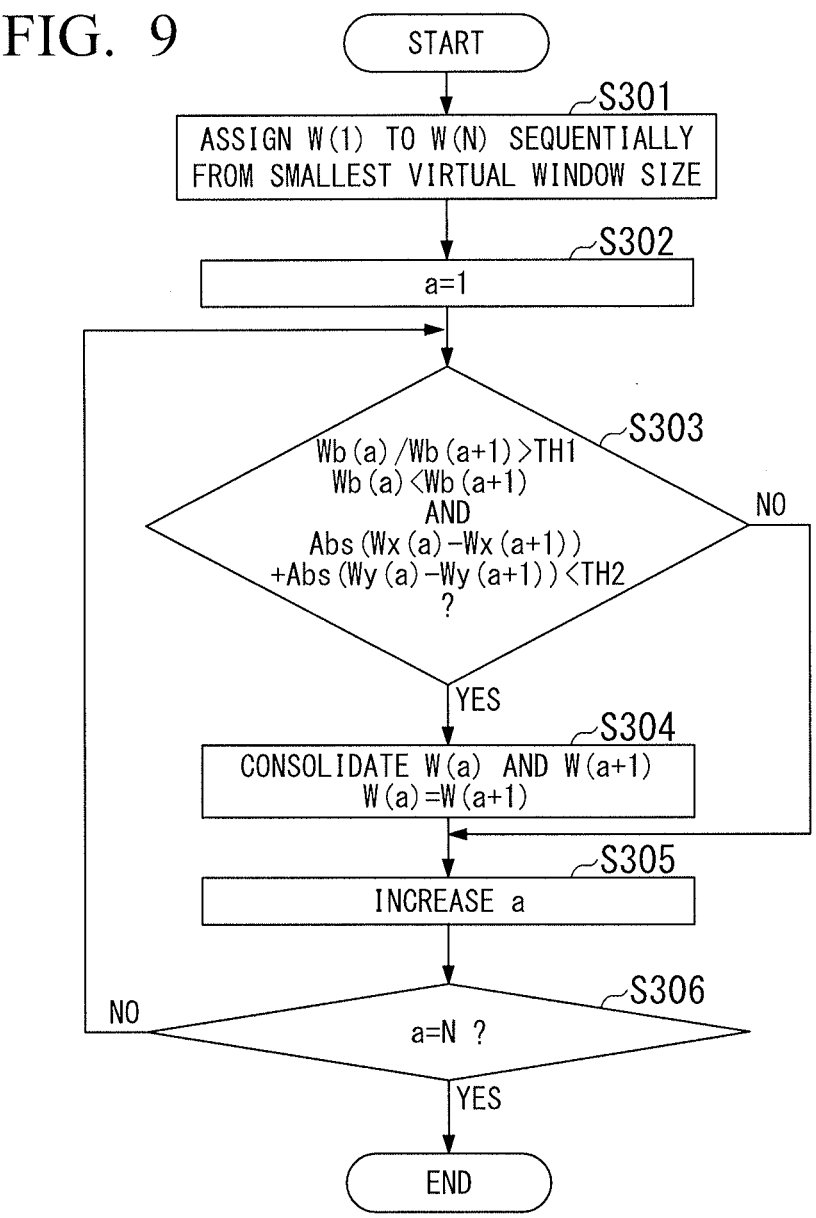

FIG. 9 is a flowchart illustrating an example of a process flow of grouping (consolidation of) virtual windows, which is performed by an object recognition unit according to an embodiment of the present invention.

Figure 10:
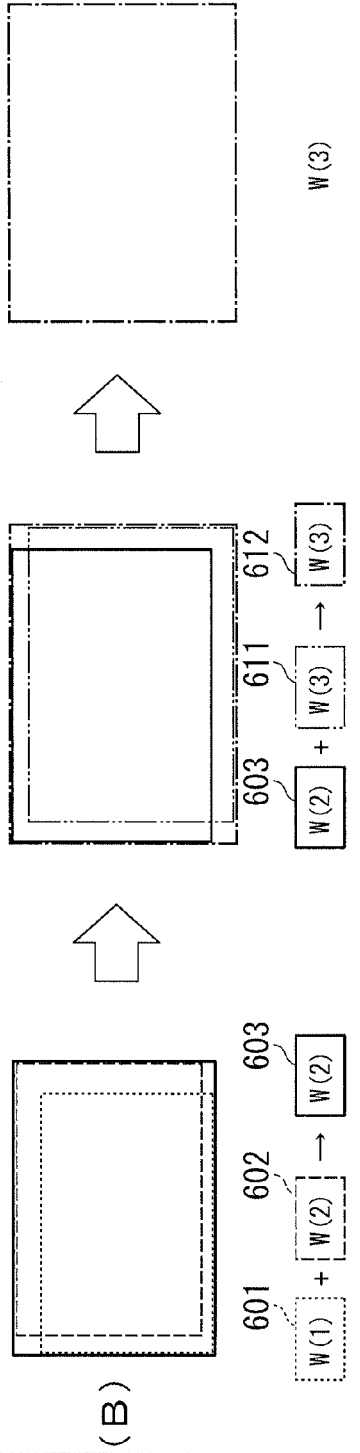

Part (A), Part (B), and Part (C) of FIG. 10 are diagrams illustrating an example of a grouping (consolidation) process.

Figure 11:
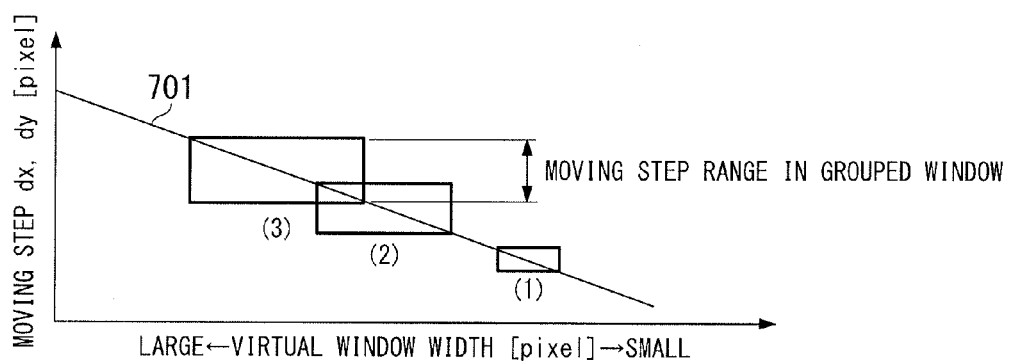

FIG. 11 is a diagram illustrating an example of a characteristic graph representing the relationship (correlation) between window widths and step widths of virtual windows serving as a basis of a grouped window.

Figure 12:
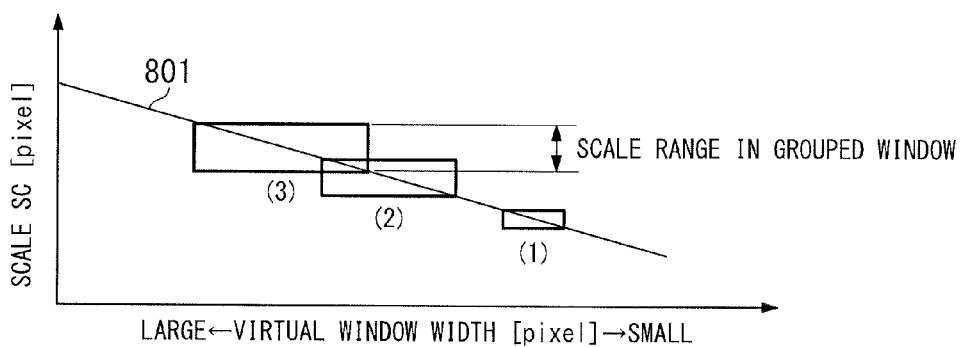

FIG. 12 is a diagram illustrating an example of a characteristic graph representing the relationship (correlation) between window widths and scales of virtual windows serving as a basis of a grouped window.

Figure 13:
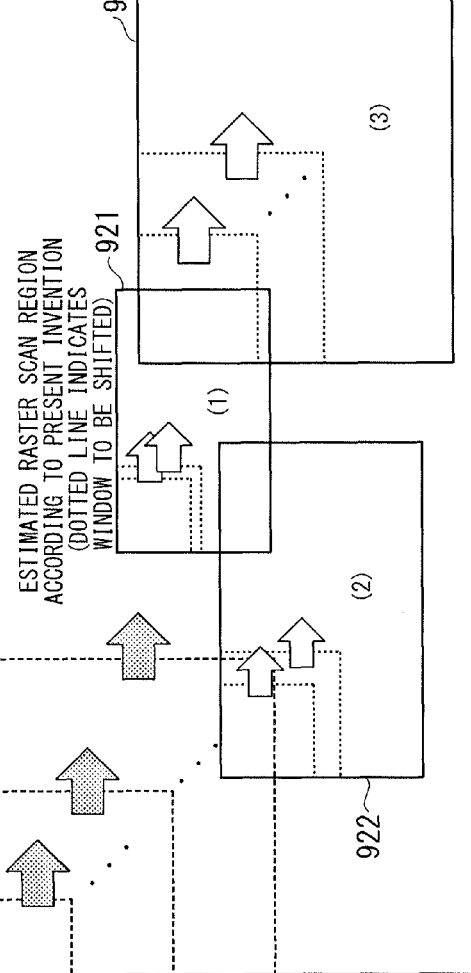

FIG. 13 is a diagram illustrating an example of a raster scan.

Figure 14:
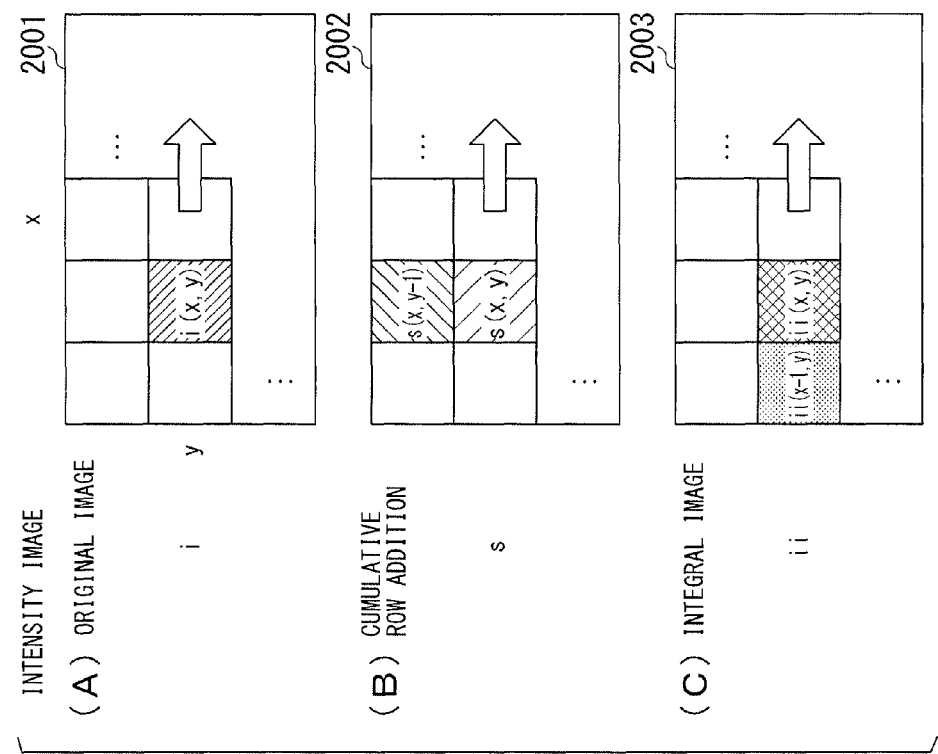

Part (A) of FIG. 14 is a diagram illustrating an example of an original image, Part (B) thereof is a diagram illustrating an example of a result of cumulative row addition, and Part (C) thereof is a diagram illustrating an example of an integral image.

Part (A) and Part (B) of FIG. 15 are diagrams illustrating Haar-like feature values.

Figure 16:
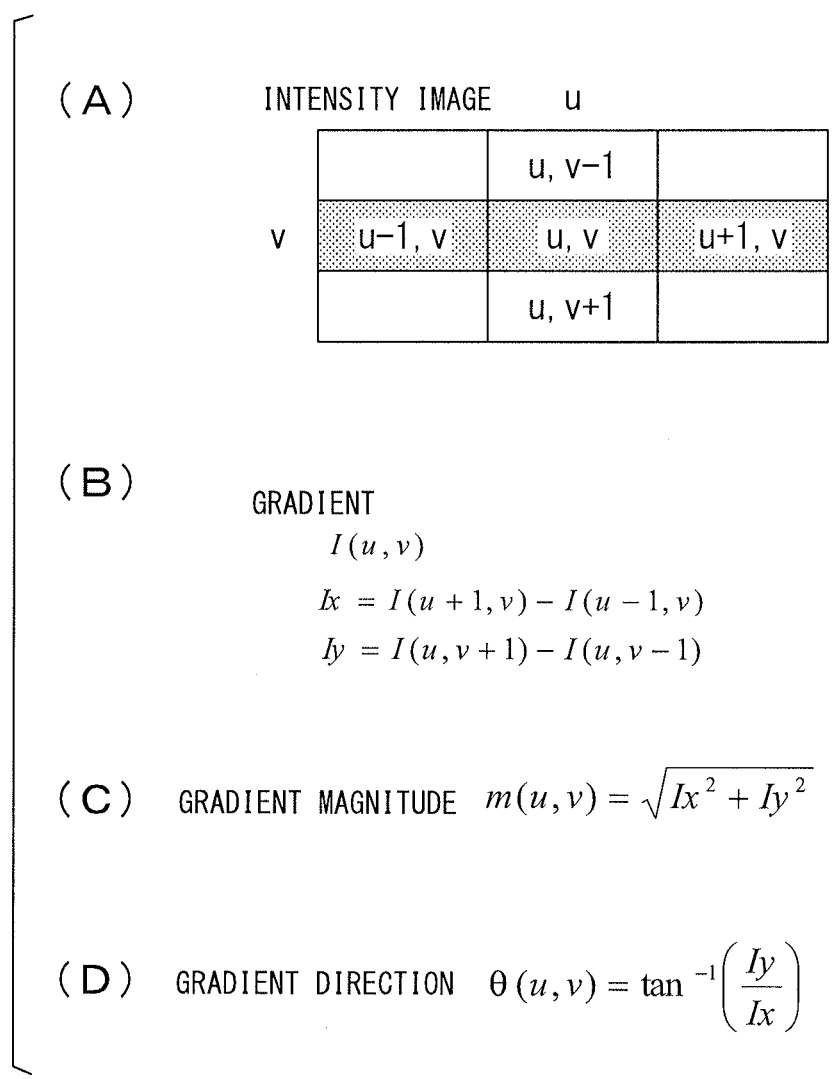

Part (A) of FIG. 16 is an expression illustrating an example of an intensity image, Part (B) thereof is an expression illustrating an example of a gradient, Part (C) thereof is an expression illustrating an example of a gradient magnitude, and Part (D) thereof is an expression illustrating an example of a gradient direction.

Figure 17:
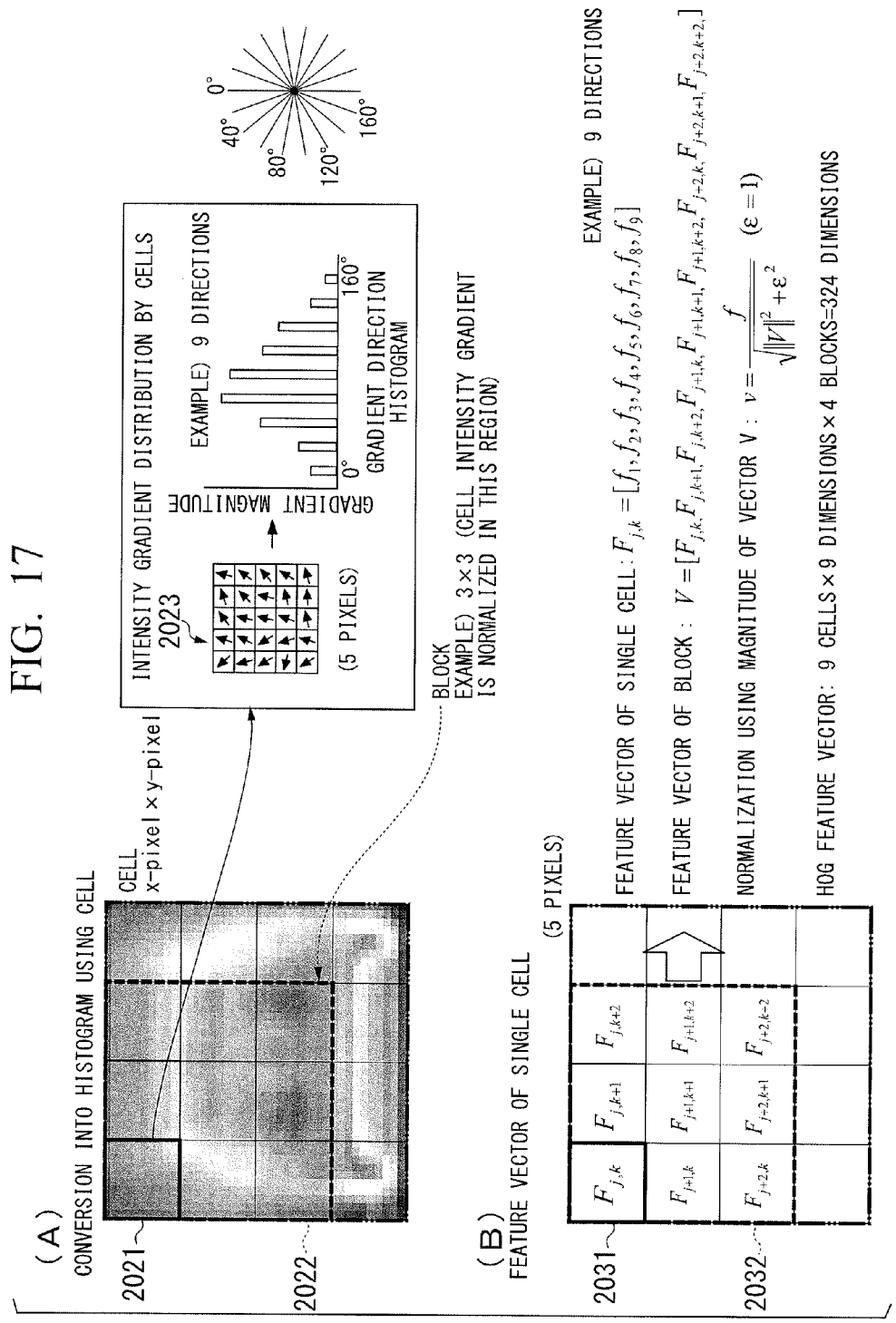

Part (A) and Part (B) of FIG. 17 are diagrams illustrating HOG feature values.

FIG. 18 is a flowchart illustrating an example of a process flow which is performed by an object recognition unit according to the background art.

DETAILED DESCRIPTION OF THE INVENTION

Definition of Terms

A gradient-direction feature value is a feature value associated with a gradient direction and a gradient magnitude of intensity of an image. Known gradient frequencies with a reduced information volume can be used as the gradient magnitude. In this specification, an extensive gradient value including the gradient magnitude and the gradient frequency is defined as a gradient value.

In this specification, an integral gradient image (integral histogram) is a result (integral gradient value) obtained by calculating the gradient direction and the gradient value (gradient magnitude or gradient frequency) of intensity of an image and integrating the gradient value (gradient magnitude or gradient frequency) of each gradient direction. Here, the integration is performed, for example, on all pixels included in a region from which an integral gradient image should be calculated.

Examples of a classifier include various classifiers such as a real AdaBoost classifier, an AdaBoost classifier, and an SVM classifier.

A subordinate concept of the classifier includes a classifier used to perform ensemble learning, a subordinate concept thereof includes a boosting classifier, and a subordinate concept thereof includes a real AdaBoost classifier.

Here, boosting includes perform ensemble learning using multiple weak classifiers.

Embodiment

In this embodiment, an on-board image recognition system which is mounted on a vehicle will be described as an example.

Figure 1:
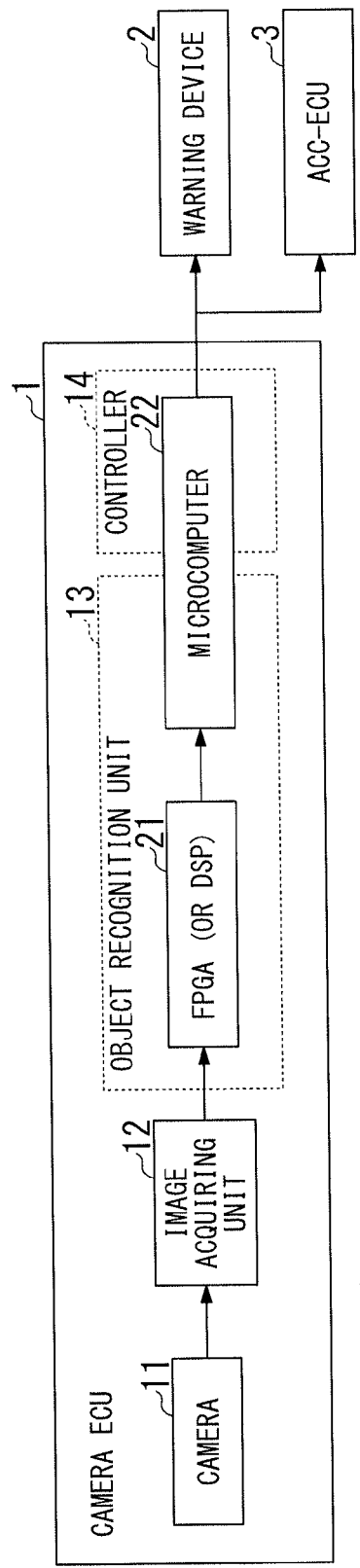
FIG. 1 is a block diagram schematically illustrating a configuration (hardware configuration) of an image recognition system according to an embodiment of the present invention.
Figure 2:
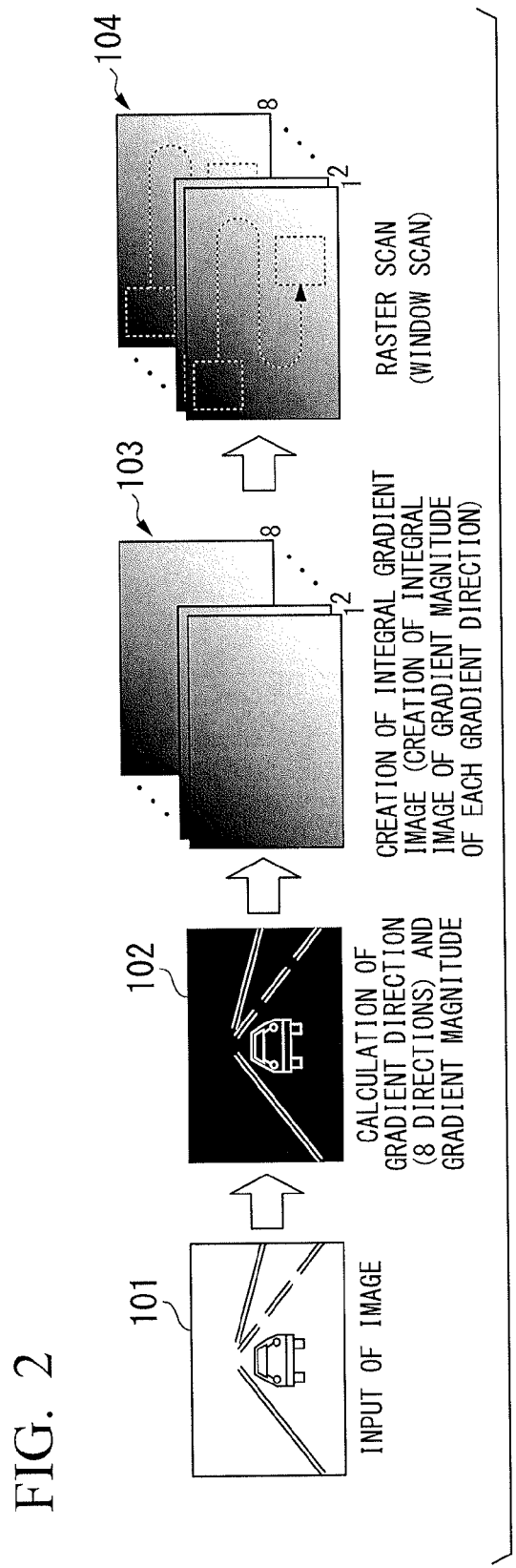
FIG. 2 is a diagram schematically illustrating an example of a process flow from acquisition of an image to a raster scan.

FIG. 1 is a block diagram schematically illustrating a configuration (hardware configuration) of an image recognition system according to an embodiment of the present invention.

The image recognition system according to this embodiment includes a camera ECU (Electronic Control Unit) 1, a warning device 2, and an ACC-ECU 3.

The camera ECU 1 is an example of an image recognition device.

The camera ECU 1 includes a camera 11, an image acquiring unit 12, an object recognition unit 13, and a controller 14.

In this embodiment, the object recognition unit 13 is constructed using the function of an FPGA (Field Programmable Gate Array) 21 and the function of a microcomputer 22.

The function of a DSP (Digital Signal Processor) may be used instead of the function of the FPGA 21 or in addition to the function of the FPGA 21.

In this embodiment, the controller 14 is constructed using the function of the microcomputer 22.

The memories and the peripheral circuits of the object recognition unit 13 and the controller 14 may employ memories and peripheral circuits stored in integrated circuits of the FPGA, the DSP, or the microcomputer or may be disposed outside them.

In the object recognition unit 13 and the controller 14, an arbitrary number of devices may be used for the devices such as the FPGA, the DSP, and the microcomputer. For example, all devices may be used, or all processing functions may be mounted on a single device or on two devices without using all the devices.

Processing units of the image recognition system according to this embodiment will be described briefly below.

In this embodiment, the camera 11 is disposed at vehicle positions for capturing an image of a predetermined direction, such as a front side, a lateral side, or a rear side of a vehicle.

The camera 11 captures an image and outputs signals of the captured image to the image acquiring unit 12.

The image acquiring unit 12 receives the image from the camera 11 as image data and outputs the received image data to the object recognition unit 13.

The object recognition unit 13 performs an image processing operation and a pattern recognition operation on the image data input from the image acquiring unit 12 by the use of the FPGA 21 or the microcomputer 22 for the purpose of recognizing an object and outputs result information of the object recognition process to the controller 14. For example, a filtering process as a pre-process is performed as the image process.

For example, information of a target object in the image of the image data is used as the result information of the pattern recognition.

The controller 14 performs a predetermined process based on the result information of the object recognition process input from the object recognition unit 13, and outputs the result information to the warning device 2 or the ACC-ECU 3.

In a specific example, the controller 14 performs a process of calculating a TTC (Time-to-Collision) or a distance to a target object, a process of tracking a target object, a process of communicating with an application function of another device or ECU (the warning device 2 or the ACC-ECU 3 in this embodiment), and the like as a predetermined process based on information of a target object which is the result information of an object recognition process input from the object recognition unit 13.

The warning device 2 or the ACC-ECU 3 is disposed to execute the application functions through the use of the controller 14 of the camera ECU 1.

The warning device 2 warns a driver, for example, about forward vehicle collision when a target object is a forward vehicle, or pedestrian collision when a target object is a pedestrian based on information input from the control unit 14.

The ACC-ECU 3 performs adaptive cruise control and the like, for example, when a target object is a forward vehicle based on information input from the control unit 14.

Processes which are performed by the object recognition unit 13 according to this embodiment will be described below with reference to FIG. 4.

FIG. 4 is a flowchart illustrating an example of a process flow which is performed by the object recognition unit 13 according to this embodiment.

In this example, a recognition algorithm is constructed by HOG feature values and real AdaBoost classifiers.

Substantially, the process of step S101, the process of step S103, the process of step S104, the process of step S105, and the process of step S106 in the flowchart according to this embodiment shown in FIG. 4 are the same as the process of step S1001, the process of step S1002, the process of step S1003, the process of step S1004, and the process of step S1005 in the flowchart shown in FIG. 18.

In the flowchart according to this embodiment shown in FIG. 4, the process of step S102 (the process of estimating a raster scan region) is added between the process of step S101 and the process of step S103. In this embodiment, this process (the process of estimating a raster scan region) is performed before starting the loop processes (the processes of steps S103 to S106) of pattern recognition using a raster scan.

In the flowchart according to this embodiment shown in FIG. 4, first, the object recognition unit 13 performs a process of calculating a gradient direction and a gradient magnitude from an acquired intensity image and integrating the gradient magnitude of each gradient direction is performed on the acquired intensity image, and calculates an integral gradient image (integral histogram) as a result (step S101).

The process of calculating the integral gradient image (integral histogram) is performed to shorten a subsequent operation processing time using the integral gradient image, and thus may not be performed. That is, in the subsequent processes, an operation capable of providing the same result without using the integral gradient image may be used.

Then, the object recognition unit 13 performs the process of estimating a raster scan region (step S102).

Accordingly, in this embodiment, the object recognition unit 13 determines a region (raster scan region) to be raster-scanned, the size of a window to be used for the raster scan, and the step width (moving step) of the window to be used for the raster scan.

Then, the object recognition unit 13 extracts a region of the integral gradient image with a predetermined coordinate region (window) through the use of raster scans (step S103).

In the raster scan process, the object recognition unit 13 sets implemetaion of the region (raster scan region) to be raster-scanned, the size of a window to be used for the raster scan, and the step width (moving step) of the window to be used for the raster scan, which are determined in the process (the process of step S102) of estimating a raster scan region.

Subsequently, the object recognition unit 13 calculates a predetermined HOG feature value (vector) for the extracted coordinate region (window) (step S104).

Then, the object recognition unit 13 performs classification using the real AdaBoost classifier which is an example of boosting based on the calculated HOG feature value (vector), and recognizes an object (an image of the object) which is set as a target in advance (step S105).

At this time, the object recognition unit 13 determines whether a series of raster scans has completed (step S106).

The object recognition unit 13 ends the process flow when it is determined that a series of raster scans has completed.

On the other hand, when it is determined that a series of raster scans are not completed, the object recognition unit 13 causes the window to shift (slide) in the raster scan region and performs the process of step S103.

Accordingly, the object recognition unit 13 causes the window to sequentially slide over the raster scan region and carries out repeated performance of the processes of steps S103 to S105 until a series of raster scans has completed.

In the series of raster scans, for example, the process of causing a window with a fixed scale (size) to sequentially slide over an image region, carrying out repeated performance of the above-mentioned process, changing the scale or the moving step (scan step) of the window, causing the window to sequentially slide, and carrying out repeated performance of the above-mentioned process a predetermined number of times. Accordingly, conversion into feature vectors is carried out.

In this embodiment, the object recognition unit 13 determines the raster scan region, the scale of the window, the v of the window in the process of step S102 and uses the determined details for the raster scan.

Here, the function of a classifier is realized by the object recognition unit 13 in this embodiment. That is, it can be understood that the object recognition unit 13 includes a classifier.

In the object recognition unit 13 according to this embodiment, the function of calculating an integral gradient image is realized by the FPGA 21 and the other functions performed by the object recognition unit 13 is realized by the microcomputer 22.

The process (the process of step S102 shown in FIG. 4) of estimating a raster scan region which is performed by the object recognition unit 13 according to this embodiment will be described referring to FIG. 5.

FIG. 5 is a flowchart illustrating an example of a process flow of the process of estimating a raster scan region, which is performed by the object recognition unit 13 according to this embodiment.

First, the object recognition unit 13 extracts one or more feature points from an image (for example, a calculated integral gradient image or an original image) and calculates an optical flow (step S201).

As a region to be processed in the image, for example, the overall region of the captured image may be used or only a region in which a target object may be present in the captured image may be used.

When the 3D analysis using a monocular camera is used along with the pattern recognition, for example, the processing result based on the technique described in Patent Document 2 or the processing result based on the technique described in "Obstacle Detection in Roas Scene using Monocular Camera", Yamaguchi et al., 2005-CVIM-151(10) (Non-patent Document 1) may be used.

A specified number of feature points are extracted and then the optical flow is calculated. For example, as described in Non-patent Document 1, feature values of Harris operators or an optical flow based on a Lucus-Kanade method can be used as the feature points and the optical flow.

Then, the object recognition unit 13 transforms image coordinates (x, y) of the extracted feature points into camera coordinates (X, Y, Z) (step S202).

In this embodiment, the object recognition unit 13 transforms the values of the image coordinates (x, y) into the values of the camera coordinates (X, Y, Z) for each feature point.

Here, the values of the image coordinates (x, y) represent coordinate values in a two-dimensional orthogonal coordinate system in the image. Here, x represents the value in the transverse (horizontal) direction and y represents the value in the longitudinal (vertical) direction.

The values of a camera coordinate (X, Y, Z) represent coordinate values in a three-dimensional orthogonal coordinate system with respect to the camera (for example, the camera 11 in this embodiment). Z represents, for example, the distance to the camera. In the plane perpendicular to the Z axis, X represents the value in the transverse (horizontal) direction and Y represents the value in the longitudinal (vertical) direction.

In the coordinate transformation in the process of step S202, for example, the 3D analysis technique described in Patent Document 2 or Non-patent Document 1 can be used, similarly to the process of step S201.

The general principle of the coordinate transformation is described in "Digital Image Processing", Association of CG-ARTS, p. 252-267 (Non-patent Document 2) or "Computer Vision: A Modern Approach", David A. Forsyth and Jean Ponce, Prentice Hall (Non-patent Document 3) and, for example, various techniques using projective transformation can be used.

The process of step S201 or the process of step S202 may be realized using transformation based on a stereoscopic camera, for example, described in Non-patent Document 2.

When the operation (calculation) in the process of step S201 or the process of step S202 is not newly performed in the process of estimating a raster scan region but the 3D analysis process or the process in the stereoscopic camera has been simultaneously performed, the processing time does not increase by using such an operation result used in the other existing processes.

In this manner, the values obtained through the process of step S201 or the process of step S202 can be quoted, for example, from the operation values based on a monocular 3D analysis or a stereoscopic image.

Various processes may be used as the process of step S201 or the process of step S202, as long as the processes of steps S203 to S205 can be performed successively thereto.

In this embodiment, the object recognition unit 13 acquires 3D information through the process of step S201 and the process of step S202.

In this embodiment, the coordinates (X, Y, Z) in the camera coordinate system are used as the coordinates in the three-dimensional (3D) coordinate system, but coordinates in various other three-dimensional coordinate systems may be used. In general, the camera coordinate system and other coordinate systems can be transformed from one to the other, and for example, when a three-dimensional coordinate system other than the camera coordinate system is used, the substantially same processes as in this embodiment have only to be performed based on the coordinate system.

Specifically, for example, in the three-dimensional coordinate system, information on a distance when a feature point (or a predetermined other point corresponding thereto) is viewed from a predetermined point of view (the position of the camera in the case of a camera coordinate system) can be used instead of the information on the distance Z at the camera coordinate (X, Y, Z), and information on a position (X, Y) other than the distance when a feature point (or a predetermined other point corresponding thereto) is viewed from a predetermined point of view (the position of the camera in the case of the camera coordinate system) can be used instead of the information on the position (X, Y) other than the distance at the camera coordinate (X, Y, Z).

Then, the object recognition unit 13 transforms the value of Z at the camera coordinate (X, Y, Z) of the feature point to a virtual window size (window scale) (step S203). Then, the object recognition unit 13 sets virtual windows.

Subsequently, the object recognition unit 13 groups the set virtual windows based on the transform result of the virtual window size (window scale) (step S204).

Then, the object recognition unit 13 determines the region (raster scan region) to be raster-scanned, the scale of the window to be used for the raster scans, and the step width (moving step) of the window to be used for the raster scans (step S205) based on the grouping result of the virtual windows.

In this embodiment, in the process of determining a window having a window size (window scale) to be used for the raster scan, since windows different therefrom are processed, such a window is referred to as a virtual window, and the term "virtual" is added to the terms associated with the virtual window.

The processes of steps S203 to S205 shown in FIG. 5 will be described below in detail with reference to FIGS. 6 to 13.

The process (the process of step S203) of causing the object recognition unit 13 to determine the virtual window size (window scale) based on the value of Z at the camera coordinate (X, Y, Z) of a feature point will be described with reference to FIG. 6.

In this embodiment, the value of Z at the camera coordinate (X, Y, Z) of a feature point represents the distance to the camera.

FIG. 6 is a diagram illustrating an example of the graph of characteristic 301 representing the relationship (correlation) between the value of distance Z at the camera coordinate of a feature point and the virtual window width. In this embodiment, the information of characteristic 301 is stored and used by the object recognition unit 13.

In the graph shown in FIG. 6, the horizontal axis represents the distance Z [m] and the vertical axis represents the virtual window width [pixel].

In the graph shown in FIG. 6, characteristic 301 is shown. In characteristic 301, Examples (A), (B), and (C) of the virtual window width transformed from the distance Z are shown in the order from the smaller value of distance Z to the larger value thereof.

In this embodiment, the characteristics expressed by Equation (1) are used as characteristic 301.

In Equation (1), any value may be used as the constant.

$$\text{Window Width[pixel]} = \text{Constant}/\text{Distance } Z[m] \quad (1)$$

In this embodiment, the shape of a virtual window (and a window used for raster scans) is set to a square, and the length (window width) in the transverse (horizontal) direction of the virtual window is equal to the length (window width) in the longitudinal (vertical) direction thereof. Accordingly, in this embodiment, when the value of the virtual window width is determined with reference to the graph shown in FIG. 6 from the value of distance Z at the time of transform to the camera coordinate for each feature point, the size (scale) of the virtual window is equivalently determined.

In the graph shown in FIG. 6, for example, the value of x or the value of y at an image coordinate (x, y) may be used as the window width represented at the vertical axis. Alternatively, for example, the value of X or the value of Y at a camera coordinate (X, Y, Z) may be used.

In another configuration example, when the shape of the virtual window (and a window used for raster scans) is set to a rectangle, for example, the relationship between the value of distance Z and the length (window width) in the transverse (horizontal) direction of the virtual window is prescribed and the relationship between the value of distance Z and the length (window width) in the longitudinal (vertical) direction of the virtual window is prescribed. Alternatively, in another configuration example, only one of the two relationships may be prescribed and the ratio of the length (window width) in the transverse (horizontal) direction of the virtual window and the length (window width) in the longitudinal (vertical) direction may be prescribed.

By employing this configuration, the size (scale) of the virtual window can be determined from the value of distance Z.

In this manner, in this embodiment, the virtual window width is set to be larger with a decrease in the value of Z at the camera coordinate (X, Y, Z) for each feature point (that is, as it gets closer to the camera), and the virtual window width is set to be smaller with an increase in the value of Z at the camera coordinate (X, Y, Z) (that is, as it gets farther from the camera).

Various characteristics other than characteristic 301 shown in FIG. 6 may be used as the characteristic representing the relationship (correlation) between the value of distance Z at the camera coordinate of a feature point and the virtual window width.

Part (A) of FIG. 7 and Part (B) of FIG. 7 are diagrams illustrating an example of the relationship between the position of a feature point and the position of the virtual window.

Here, the position of the virtual window relative to the position of the feature point may be set arbitrarily, and is set in advance by a user (person), for example, so as to achieve an arrangement in which a target object is likely to be included in the virtual window in this embodiment.

The object recognition unit 13 sets the determined position of the virtual window relative to the position of the feature point based on the set details.

Part (A) of FIG. 7 and Part (B) of FIG. 7 show an example where a virtual window having the virtual window width determined from the value of Z at the camera coordinate (X, Y, Z) of a feature point differs relative to the position of the image coordinate (x, y) of the feature point.

In the example shown in Part (A) of FIG. 7, the object recognition unit 13 sets a virtual window 402 such that the outer frame of the virtual window 402 has an equal gap in the transverse (horizontal) direction and the longitudinal (vertical) direction from the value (x1, y1) of the image coordinate of a feature point 401. That is, the object recognition unit 13 sets the virtual window 402 such that the position of the feature point 401 is located at the center of the virtual window 402.

Specifically, when the virtual window 402 is square and the length (window width) of a side of the virtual window 402 is Wb, the distances from the value (x1, y1) of the image coordinate of the feature point 401 to the left and right sides of the virtual window 402 are Wb/2 and the distances to the upper and lower sides of the virtual window 402 are Wb/2.

In the example shown in Part (B) of FIG. 7, the object recognition unit 13 sets a virtual window 412 such that the outer frame of the virtual window 412 have gaps of predetermined ratios in the transverse (horizontal) direction and the longitudinal (vertical) direction from the value (x1, y1) of the image coordinate of a feature point 411.

In the example shown in Part (B) of FIG. 7, the ratio in the transverse (horizontal) direction is set to 1:1 and the ratio in the longitudinal (vertical) direction is set to 8:2 (=4:1).

Specifically, when the virtual window 412 is square and the length (window width) of a side of the virtual window 412 is Wb, the distances from the value (x1, y1) of the image coordinate of the feature point 411 to the left and right sides of the virtual window 412 is Wb/2, the distance to the upper side of the virtual window 412 is (Wb×0.8), and the distance to the lower side of the virtual window 412 is (Wb×0.2).

The process (the process of step S204) of causing the object recognition unit 13 to group (combine) virtual windows based on the transform result of the virtual window size (window scale) will be described below with reference to FIG. 8.

FIG. 8 is a diagram illustrating an example of the process of grouping (consolidation of) virtual windows.

Here, the object recognition unit 13 determines a virtual window size (window scale) for all the extracted feature points and sets a virtual window for each feature point. Here, it is assumed that a plurality of feature points is extracted.

The object recognition unit 13 performs the process of grouping (consolidation of) the virtual windows (herein, multiple virtual windows) transformed from the feature points.

In this embodiment, the object recognition unit 13 groups two virtual windows, which are determined to have a small difference between the positions at the image coordinate (x, y) and a small difference between the virtual window sizes based on a predetermined condition, into the same set (group) out of virtual windows obtained from the plurality of feature points. In this case, in this embodiment, the object recognition unit 13 assigns the virtual windows obtained from the feature points to sets (groups) in the order from the smaller virtual window size to the larger virtual window size.

Here, as the condition for determining that the difference between the positions of the image coordinate (x, y) of the two virtual windows is small, for example, a condition can be used in which the addition of the absolute value of the x difference and the absolute value of the y difference between the positions (or the positions of two feature points corresponding to the virtual windows) of the two virtual windows is equal to or less than a predetermined threshold value (a threshold value associated with the addition of the absolute value of the x difference and the absolute value of the y difference).

In addition, as the condition for determining that the difference between the positions of the image coordinate (x, y) of the two virtual windows is small, for example, a condition can be used in which the x difference between the positions (or the positions of two feature points corresponding to the virtual windows) of the two virtual windows is equal to or less than a predetermined threshold value (a threshold value associated with the x value) and the y difference is equal to or less than a predetermined threshold value (a threshold value associated with the y value). The threshold value associated with the x value and the threshold value associated with the y value may be, for example, equal to each other or different from each other.

In addition, as the condition for determining that the difference between the positions of the image coordinate (x, y) of the two virtual windows is small, for example, a condition can be used in which the distance between the positions (or the positions of two feature points corresponding to the virtual windows) of the two virtual windows is equal to or less than a predetermined threshold value (a threshold value associated with the distance).

For example, a distance determined using any technique such as a Euclidean distance can be used as the distance between the positions (or the positions of two feature points corresponding to the virtual windows) of the two virtual windows.

For example, the central position of the corresponding window can be used as the position (or the position corresponding to the x coordinate value and the y coordinate value) of the virtual window when the x coordinate value or the y coordinate value at an image coordinate (x, y) of a window (herein, including a virtual window) is designated. For example, a predetermined specific position in the corresponding window such as a position of a predetermined vertex of the window may be used.

As the condition for determining that the difference in window size between two virtual windows is small, for example, a condition can be used in which the ratio of the virtual window sizes (size ratio) is equal to or less than a predetermined threshold value (a threshold value associated with the virtual window size).

When the shape of a virtual window is not a square but a rectangle, for example, an area ratio of the virtual windows can be used as the size ratio of the virtual windows, or a condition may be used in which one or both of the lengths (window widths) of two different sides satisfy the above-mentioned condition on the size ratio.

In this embodiment, the grouping conditions are determined using the image coordinate (x, y). In another configuration example, the grouping conditions may be determined using the distance Z and the positions X and Y at a camera coordinate (X, Y, Z) and sets (groups) may be created based on the determination result.

(A), (B), and (C) shown in FIG. 8 show examples of the position difference at the image coordinate (x, y) and the virtual window size difference between two virtual windows.

In the state shown in (A) of FIG. 8, since the position difference at the image coordinate (x, y) and the virtual window size difference between two virtual windows satisfy the above-mentioned conditions, these two virtual windows are consolidated into the same set (group).

In the state shown in (B) of FIG. 8, since the virtual window size difference between two virtual windows does not satisfy the above-mentioned condition, these virtual windows are not consolidated.

In the state shown in (C) of FIG. 8, since the position difference (the difference in the coordinate value in the transverse or longitudinal direction in this example) at the image coordinate (x, y) between two virtual windows does not satisfy the above-mentioned conditions, these virtual windows are not consolidated.

In FIG. 8, the horizontal axis represents the virtual window size (for example, a window width) [pixel], the vertical axis represents the position x [pixel] in the transverse (horizontal direction) at an image coordinate (x, y), a plurality of feature points is shown therein, and sets (groups) 502, 512, and 522 of (1), (2), and (3) obtained through grouping (consolidation) of the virtual windows are also shown. The feature points included in the frames of the sets (groups) 502, 512, and 522 are included in the sets (groups) 502, 512, and 522, respectively.

For the purpose of convenience for drawing, in FIG. 8, reference numerals are given to only the feature points 501, 511, and 521 out of the multiple feature points, but the same is true of the other feature points.

In this example, only the position x [pixel] in the transverse (horizontal) direction at an image coordinate (x, y) is considered, but, for example, the position y [pixel] in the longitudinal (vertical) direction at the image coordinate (x, y) is also considered.

In this manner, in this embodiment, the object recognition unit 13 groups (combines) two virtual windows, in which the positions at the image coordinate (x, y) are close to each other and the virtual window sizes are close to each other in the ascending order from the smallest virtual window size, into the same set (group).

Various other techniques may be used as the grouping (consolidation) technique.

The process of grouping (consolidation of) virtual windows, which is performed by the object recognition unit 13 according to this embodiment, will be described below with reference to FIG. 9.

FIG. 9 is a flowchart illustrating an example of a process flow of grouping (consolidation of) virtual windows, which is performed by the object recognition unit 13 according to this embodiment.

In this example, it is assumed that the object recognition unit 13 extracts N (where N is an integer of 2 or larger) feature points and obtains N virtual windows transformed from the feature points. In this example, it is assumed that the shape of a virtual window is square and the size thereof is specified by one window width.

In this example, a=1, 2, . . . , N is set, W(a) represents an a-th virtual window, W(a+1) represents an (a+1)-th virtual window, W(1) represents a first (minimum) virtual window, W(N) represents an N-th (maximum) virtual window, Wb(a) represents the window width of the a-th virtual window, Wb(a+1) represents the window width of the (a+1)-th virtual window, Wx(a) represents the value of the x coordinate at the image coordinate (x, y) as the position of the a-th virtual window, Wx(a+1) represents the value of the x coordinate at the image coordinate (x, y) as the position of the (a+1)-th virtual window, Wy(a) represents the value of the y coordinate at the image coordinate (x, y) as the position of the a-th virtual window, and Wy(a+1) represents the value of the y coordinate at the image coordinate (x, y) as the position of the (a+1)-th virtual window.

First, the object recognition unit 13 assigns W(1), W(2), . . . , W(N) to the N virtual windows in the ascending order from the smallest virtual window size (step S301).

Then, the object recognition unit 13 sets the value of parameter a to a=1 to perform the first assignment (step S302).

Subsequently, the object recognition unit 13 determines whether the virtual window corresponding to W(a) and the virtual window corresponding to W(a+1) satisfy both of Equations (2) and (3) (step S303).

Here, Equation (2) shows an example of the condition associated with the window width (the window size in this embodiment) of a virtual window. Various values may be set as the threshold value TH1 in Equation (2).

Specifically, in Equation (2), the ratio of the window width Wb(a) of the a-th virtual window and the window width Wb(a+1) of the (a+1)-th virtual window is calculated and it is determined whether the calculated ratio is greater than a predetermined threshold value TH1. Here, since the window sizes of the virtual windows are arranged in the ascending order with respect to a, Wb(a)<Wb(a+1) is established.

That is, the condition of Equation (2) is a condition in which adjacent virtual windows are consolidated when the window sizes thereof are close to each other.

Equation (3) shows an example of a condition associated with the position of a virtual window. In Equation (3), Abs(P) represent the absolute value of P. Various values may be set to the threshold value TH2 in Equation (3).

Specifically, in Equation (3), the addition result of the absolute value of the difference between the x coordinate Wx(a) of the position of the a-th virtual window and the x coordinate Wx(a+1) of the position of the (a+1)-th virtual window and the absolute value of the difference between the y coordinate Wy(a) of the position of the a-th virtual window and the y coordinate Wy(a+1) of the position of the (a+1)-th virtual window is calculated and it is determined whether the addition result is smaller than a predetermined threshold value TH2. That is, the condition of Equation (3) is a condition in which adjacent virtual windows are consolidated when the positions thereof are close to each other.

By the AND logic of the condition of Equation (2) and the condition of Equation (3), it is determined whether two virtual windows are consolidated.

$$Wb(a)/Wb(a+1) > TH1$$

$$Wb(a) < Wb(a+1) \tag{2}$$

$$Abs(Wx(a) - Wx(a+1)) + Abs(Wy(a) - Wy(a+1)) < TH2 \tag{3}$$

When it is determined in the process of step S303 that the virtual window corresponding to W(a) and the virtual window corresponding to W(a+1) satisfy both of Equations (2) and (3), the object recognition unit 13 groups (combines) the virtual window corresponding to W(a) and the virtual window corresponding to W(a+1) (step S304).

Then, the object recognition unit 13 increases the value of a parameter "a" by 1 (step S305).

On the other hand, when it is determined in the process of step S303 that neither the virtual window corresponding to W(a) nor the virtual window corresponding to W(a+1) satisfy both of Equations (2) and (3) (that is, at least one is not satisfied), the object recognition unit 13 does not perform the grouping (consolidation) but increases the value of the parameter "a" by 1 (step S305).

Here, the increase of the value of a in the process of step S305 is performed to cause the process flow to go to the next loop in the loop processes of steps S303 to S306.

In the next loop, the present W(a+1) becomes W(a) and the virtual window corresponding to the present W(a+1) becomes a virtual window larger in size than the present W(a+1).

The object recognition unit 13 determines whether a=N is established after the process of step S305 (step S306).

When it is determined in the process of step S306 that a=N is not established, the object recognition unit 13 performs the process of step S303 and performs a next loop.

On the other hand, when it is determined in the process of step S306 that a=N is established, the object recognition unit 13 ends the process flow. In this manner, the loop processes are repeatedly performed until a=N is established.

An example of the process (the grouping (consolidation) process) of step S304 shown in FIG. 9 will be described below with reference to Part (A) of FIG. 10, Part (B) of FIG. 10, and Part (C) of FIG. 10.

Part (A) of FIG. 10 is a diagram illustrating an example of the grouping (consolidation) process.

In this example, when the virtual window corresponding to W(a) and the virtual window corresponding to W(a+1) are grouped (consolidated), the object recognition unit 13 combines both virtual windows at the outermost shell thereof and specifically, draws the outermost shell (rectangle in this embodiment) of a region in which both virtual windows do not overlap to create a single window (virtual window). The object recognition unit 13 replaces the original virtual window corresponding to W(a+1) with the window (virtual window) created through the grouping (consolidation).

Regarding the window (virtual window) created through the grouping (consolidation), the object recognition unit 13 uses, for example, the x coordinate value Wx(a+1) or the y coordinate value Wy(a+1) of the position of the virtual window corresponding to the original W(a+1) as the x coordinate value or the y coordinate value at the image coordinate (x, y) of the position of the window (virtual window).

Regarding the window (virtual window) created through the grouping (consolidation), the object recognition unit 13 may use, for example, the x coordinate value Wx(a+1) or the y coordinate value Wy(a+1) of the position of the virtual window corresponding to the original W(a+1) as the x coordinate value or the y coordinate value at the image coordinate (x, y) of the position of a feature point corresponding to the window (virtual window), or may use the x coordinate value or the y coordinate value at the image coordinate (x, y) of a feature point of the virtual window corresponding to the original W(a+1) in another example.

Part (B) of FIG. 10 is a diagram illustrating a specific example of the grouping (consolidation) process.

First, the object recognition unit 13 groups (combines) a virtual window 601 corresponding to W(1) and a virtual window 602 corresponding to W(2) and creates a virtual window 603 corresponding to a new W(2).

Then, the object recognition unit 13 groups (combines) a virtual window 603 corresponding to the newly-created W(2) and a virtual window 611 corresponding to W(3) and creates a virtual window 612 corresponding to a new W(3).

The same is true of the process for W(4) and the processes subsequent thereto.

Part (C) of FIG. 10 shows another example of the technique of determining the x coordinate value or the y coordinate value at an image coordinate (x, y) of the position of a window (virtual window) created through the grouping (consolidation). In this example, when the virtual window corresponding to W(a) and the virtual window corresponding to W(a+1) are grouped (consolidated), the object recognition unit 13 sets the average value of the x coordinate value at the position of the virtual window corresponding to the original W(a) and the x coordinate value at the position of the virtual window corresponding to the original W(a+1) as the x coordinate value at the image coordinate (x, y) of the position of the consolidated window (virtual window), and sets the average value of the y coordinate value at the position of the virtual window corresponding to the original W(a) and the y coordinate value at the position of the virtual window corresponding to the original W(a+1) as the y coordinate value at the image coordinate (x, y) of the position of the consolidated window (virtual window).

Equation (4) shows an example of an expression for realizing such an operation on the x coordinate value.

$$Wx(a+1)=(Wx(a)+Wx(a+1))/2 \qquad (4)$$

Regarding the x coordinate value or the y coordinate value at the image coordinate (x, y) of the feature point corresponding to the window (virtual window) created through the grouping (consolidation), when the virtual window corresponding to W(a) and the virtual window corresponding to W(a+1) are grouped (consolidated), the object recognition unit 13 may set the average value of the x coordinate value of the position of the virtual window corresponding to the original W(a) and the x coordinate value of the position of the virtual window corresponding to the original W(a+1) as the x coordinate value at the image coordinate (x, y) of the feature point corresponding to the grouped window (virtual window), and may set the average value of the y coordinate value of the position of the virtual window corresponding to the original W(a) and the y coordinate value of the position of the virtual window corresponding to the original W(a+1) as the y coordinate value at the image coordinate (x, y) of the feature point corresponding to the grouped window (virtual window).

In another example, when the virtual window corresponding to W(a) and the virtual window corresponding to W(a+1) are grouped (consolidated), the object recognition unit 13 may set the average value of the x coordinate value at the image coordinate (x, y) of the feature point corresponding to the virtual window corresponding to the original W(a) and the x coordinate value at the image coordinate (x, y) of the feature point corresponding to the virtual window corresponding to the original W(a+1) as the x coordinate value at the image coordinate (x, y) of the feature point corresponding to the grouped window (virtual window), and may set the average value of the y coordinate value at the image coordinate (x, y) of the feature point corresponding to the virtual window corresponding to the original W(a) and the y coordinate value at the image coordinate (x, y) of the feature point corresponding to the virtual window corresponding to the original W(a+1) as the y coordinate value at the image coordinate (x, y) of the feature point corresponding to the grouped window (virtual window).

In this embodiment, as shown in Part (A) of FIG. 10 and Part (B) of FIG. 10, when the virtual window corresponding to W(a) and the virtual window corresponding to W(a+1) are grouped (consolidated), both virtual windows are consolidated at the outer shells thereof. However, in another example, the size of the grouped virtual window may be set to the size (the size of any one of the virtual window corresponding to W(a) and the virtual window corresponding to W(a+1)) of one virtual window before consolidation, or may be set to the average value of the sizes of the two virtual windows (the virtual window corresponding to W(a) and the virtual window corresponding to W(a+1)) before consolidation.

In this embodiment, the virtual windows are grouped (consolidated) by the object recognition unit 13, and the finally-obtained virtual window (the virtual window as a result of the grouping (consolidation)) is referred to as a grouped window.

In this embodiment, the object recognition unit 13 determines and sets the grouped window as a raster scan region (a part of the process of step S205 shown in FIG. 5).

Multiple different grouped windows may be obtained from a series of virtual windows to be grouped (consolidated).

The process (a part of the process of step S205 shown in FIG. 5) of determining a step width (moving step) of each grouped window (each raster scan region) obtained through the grouping (consolidation) by the object recognition unit 13 will be described below with reference to FIG. 11.

FIG. 11 is a diagram illustrating an example of a graph of characteristic 701 representing the relationship (correlation) between the window widths and the step widths of the virtual windows serving as a basis of the grouped window. In this embodiment, the information of characteristic 701 is stored and used in and by the object recognition unit 13.

In the graph shown in FIG. 11, the horizontal axis represents the window width of a virtual window [pixel] and the vertical axis represents the step width (a step width dx and a step width dy) [pixel].

In the graph shown in FIG. 11, the window widths of the virtual windows serving as a basis of the grouped window are used as the window width marked in the horizontal axis.

In this embodiment, the shape of the virtual window is set to square and the length (window width) in the transverse (horizontal) direction and the length (window width) in the longitudinal (vertical) direction of a virtual window are equal to each other.

For example, the x value at the image coordinate (x, y) or the y value thereof may be used as the window width. In another example, the X value or the Y value at a camera coordinate (X, Y, Z) may be used as the window width.

In this embodiment, the object recognition unit 13 uses the same common value as the step width dx of the x coordinate and the step width dy of the y coordinate at the image coordinate (x, y).

In this case, in another configuration example, when the shape of a virtual window is square, the object recognition unit 13 can use, for example, a predetermined one length (window width) of the length (window width) in the transverse (horizontal) direction and the length (window width) in the longitudinal (vertical) direction of a virtual window, or can use, for example, the average of the length (window width) in the transverse (horizontal) direction and the length (window width) in the longitudinal (vertical) direction of a virtual window.

In another configuration example, the object recognition unit 13 may use different values as the step width dx of the x coordinate and the step width dy of the y coordinate at the image coordinate (x, y).

In this case, the object recognition unit 13 can determine the step width dx of the x coordinate at the image coordinate (x, y) based on the length (window width) in the transverse (horizontal) direction of a virtual window and can determine the step width dy of the y coordinate at the image coordinate (x, y) based on the length (window width) in the longitudinal (vertical) direction of the virtual window.

For example, the object recognition unit 13 may store and use characteristics in which the step width dx of the x coordinate and the step width dy of the y coordinate at the image coordinate (x, y) are different from each other as characteristics 701 shown in FIG. 11. In this case, the object recognition unit 13, for example, can determine the step width dx of the x coordinate at the image coordinate (x, y) based on the length (window width) in the transverse (horizontal) direction of the virtual window and can determine the step width dy of the y coordinate at the image coordinate (x, y) based on the length (window width) in the longitudinal (vertical) direction of the virtual window, or may determine both the step width dx of the x coordinate and the step width dy of the y coordinate at the image coordinate (x, y) based on a predetermined one length (window width) of the length (window width) in the transverse (horizontal) direction and the length (window width) in the longitudinal (vertical) direction of the virtual window.

In this embodiment, regarding the steps widths dx and dy determined based on the window widths of all the virtual windows (the original virtual windows created through the process of step S203 shown in FIG. 5 in this embodiment, from which the virtual windows created in the course of grouping (consolidation) are excluded) serving as a basis of each grouped window, the object recognition unit 13 sets the range between a minimum step width and a maximum step width thereof as the step width range to be used for the raster scans in the corresponding grouped window. Then, the object recognition unit 13 uses the step widths in the set range.

In a specific example, regarding the step width dx of the x coordinate and the step width dy of the y coordinate of a certain grouped window, when the minimum value (the minimum step width) of the step widths determined based on the window widths of all the virtual windows serving as a basis of the corresponding grouped window is A1 (for example, A1=5) and the maximum value (the maximum step width) thereof is B1 (for example, B1=10), the object recognition unit 13 uses the step widths (for example, 5, 6, 7, 8, 9, and 10) obtained by changing the step width from the minimum value to the maximum value by a predetermined variation Δ1 (for example, Δ1=1) for the raster scans in the grouped window (raster scan region).

FIG. 11 shows Examples (1), (2), and (3) of three different step width ranges determined by the object recognition unit 13.

The characteristics representing the relationship (correlation) between the window width and the step width of the virtual windows serving as a basis of a grouped window are not limited to characteristic 701 shown in FIG. 11, but various characteristics may be used.

The process (a part of the process of step S205 shown in FIG. 5) of causing the object recognition unit 13 to determine the scale (the window scale width) of each grouped window (each raster scan region) obtained through the grouping (consolidation) will be described below with reference to FIG. 12.

FIG. 12 is a diagram illustrating an example of a graph of characteristic 801 representing the relationship (correlation) between the window width and the scale of the virtual windows serving as a basis of a grouped window. In this embodiment, the information of characteristic 801 is stored and used by the object recognition unit 13.

In the graph shown in FIG. 12, the horizontal axis represents the window width [pixel] of a virtual window and the vertical axis represents the scale SC [pixel].

In the graph shown in FIG. 12, the window widths of the virtual windows serving as a basis of a grouped window are used as the window width marked in the horizontal axis.

In this embodiment, the shape of a virtual window is set to square, and the length (window width) in the transverse (horizontal) direction and the length (window width) in the longitudinal (vertical) direction of a virtual window are equal to each other.

For example, the value of x or the value of y at an image coordinate (x, y) may be used as the window width. Alternatively, for example, the value of X or the value of Y at a camera coordinate (X, Y, Z) may be used as the window width.

In this embodiment, the object recognition unit 13 uses the same common value as the scale SCx of the x coordinate and the scale SCy of the y coordinate at the image coordinate (x, y). That is, in this embodiment, the object recognition unit 13 uses a window having a square shape for the raster scans.

In this case, in another configuration example, when the shape of a virtual window is rectangular, the object recognition unit 13, for example, may use a predetermined one length (window width) of the length (window width) in the transverse (horizontal) direction and the length (window width) in the longitudinal (vertical) direction of a virtual window, or may use the average value of the length (window width) in the transverse (horizontal) direction and the length (window width) in the longitudinal (vertical) direction of a virtual window.

In another configuration example, the object recognition unit 13 may use different values as the scale SCx of the x coordinate and the scale SCy of the y coordinate at the image coordinate (x, y).

In this case, the object recognition unit 13 can determine the scale SCx of the x coordinate at the image coordinate (x, y) based on the length (window width) in the transverse (horizontal) direction of a virtual window and can determine the scale SCy of the y coordinate at the image coordinate (x, y) based on the length (window width) in the longitudinal (vertical) direction of the virtual window.

For example, the object recognition unit 13 may store and use characteristics in which the scale SCx of the x coordinate and the scale SCy of the y coordinate at the image coordinate (x, y) as characteristic 801 shown in FIG. 12 are different from each other. In this case, for example, the object recognition unit 13 may determine the scale SCx of the x coordinate at the image coordinate (x, y) based on the length (window width) in the transverse (horizontal) direction of the virtual window and may determine the scale SCy of the y coordinate at the image coordinate (x, y) based on the length (window width) in the longitudinal (vertical) direction of the virtual window, or may determine both of the scale SCx of the x coordinate and the scale SCy of the y coordinate at the image coordinate (x, y) based on a predetermined one length (window width) of the length (window width) in the transverse (horizontal) direction and the length (window width) in the longitudinal (vertical) direction of the virtual window.

In this embodiment, regarding the scales SC (the scale SCx and the scale SCy) determined based on the window widths of all the virtual windows (the original virtual windows created through the process of step S203 shown in FIG. 5 in this embodiment, from which the virtual windows created in the course of grouping (consolidation) are excluded) serving as a basis of each grouped window, the object recognition unit 13 sets the range between the minimum scale and the maximum scale as the range of scales used for the raster scans. Then, the object recognition unit 13 uses the scales in the set range.

In a specific example, regarding the scale SC (the scale SCx or the scale SCy) for each grouped window, when the minimum value (minimum scale) of the scale determined based on the window widths of al the virtual windows serving as a basis of the grouped window is A2 (for example, A2=2) and the maximum value (maximum scale) is B2 (for example, B2=6), the object recognition unit 13 uses the scales (for example, 2, 4, and 6), which are obtained by changing the scale from the minimum value to the maximum value by a predetermined variation A2 (for example, A2=2), for the raster scans in the grouped window (raster scan region).

FIG. 12 shows Examples (1), (2), and (3) of three different scale ranges determined by the object recognition unit 13.

The characteristics representing the relationship (correlation) between the window width and the scale of the virtual windows serving as a basis of a grouped window are not limited to characteristic 801 shown in FIG. 12, but various characteristics may be used.

In this manner, in this embodiment, the object recognition unit 13 determines the region (raster scan region) to be raster-scanned, the scale of the window to be used for the raster scan, the step width (moving step) of the window to be used for the raster scan based on the grouping result of the virtual windows (the process of step S205 shown in FIG. 5).

An example of a raster scan in a conventional example and the present invention (this embodiment) will be described with reference to FIG. 13.

In this example, the case where the processes of the flowchart according to the background art shown in FIG. 18 are performed is exemplified as the conventional example.

In this example, the case where the processes of the flowchart according to this embodiment shown in FIGS. 4 and 5 are performed is exemplified as the present invention.

FIG. 13 is a diagram illustrating an example of a raster scan.

In FIG. 13, an entire image (entire captured image) 901 captured by a camera (for example, the camera 11 shown in FIG. 1 or a device corresponding thereto), a raster scan region 911 according to the background art, a raster scan region 921 according to a first example (1) of the present invention, a raster scan region 922 according to a second example (2) of the present invention, and a raster scan region 923 according to a third example (3) of the present invention are shown.

In FIG. 13, examples of windows to be shifted are shown by dotted lines in the raster scan regions 911 and 921 to 923.

The raster scan region 921 according to the first example (1) of the present invention is a raster scan region obtained by grouping (consolidation of) feature points which are relatively present with a large distance.

The raster scan region 922 according to the second example (2) of the present invention is a raster scan region obtained by grouping (consolidation of) feature points which are relatively present between a large distance and a middle distance.

The raster scan region 923 according to the third example (3) of the present invention is a raster scan region obtained by grouping (consolidation of) feature points which are relatively present between a middle distance and a small distance.

In the raster scan according to the background art, since the raster scan region is wide and it is necessary to adjust the scale and the moving step of the window and to sequentially scan the wide raster scan region, the number of unnecessary window processes (the number of unnecessary windows) increases.

On the contrary, in the raster scan according to the present invention, the region (raster scan region) to be raster-scanned, the size of a window to be used for the raster scan, and the step width (moving step) of the window to be used for the raster scan are determined based on the grouping result of the virtual windows. Accordingly, in the raster scan according to the present invention, the raster scan region can be reduced, the scale or the moving step of the window can be reduced for the small raster scan region, and thus the number of unnecessary window processes (the number of unnecessary windows) can be reduced, compared with the raster scan according to the background art.

In this manner, in this embodiment, since the object recognition unit 13 can narrow the region (raster scan region) to be raster-scanned by performing the process of estimating the raster scan region and the ranges of the scale and the step width (moving step) for the narrowed raster scan region can be narrowed, the number of window processes to be scanned (the number of windows to be scanned) can be significantly reduced when compared with that in the raster scan according to the background art.

In grouping (consolidation of) the virtual windows obtained from feature points, for example, the object recognition unit 13 excludes feature points satisfying a predetermined condition out of the plurality of extracted feature points before performing the grouping (consolidation) process and does not use the excluded feature points for the grouping (consolidation) process. Accordingly, it is possible to further enhance the grouping (consolidation) efficiency and to improve the grouping (consolidation) accuracy.

Specifically, the predetermined condition for defining the feature points to be excluded may include a condition (a first condition on the height) in which a feature point is excluded from candidates to be grouped (consolidated) when the coordinate value (for example, the coordinate value Y) representing a height at a coordinate (X, Y, Z) of the point (feature point) in a three-dimensional spatial coordinate system such as a camera coordinate system is greater than or equal to a predetermined threshold value (a first threshold value associated with the height), a condition (a second condition on the height) in which a feature point is excluded from candidates to be grouped (consolidated) when the coordinate value (for example, the coordinate value Y) representing the height thereof is equal to or less than a predetermined threshold value (a second threshold value associated with the height), or both conditions.

In the first condition on the height, for example, a feature point which is present at such a high position (for example, in the sky) at which a target object is not present can be excluded from candidates to be grouped (consolidated) and cannot be subjected to the grouping (consolidation).

In the second condition on the height, for example, a feature point which is present at such a low position (for example, under the ground) at which a target object is not present can be excluded from candidates to be grouped (consolidated) and cannot be subjected to the grouping (consolidation).

Accordingly, it is possible to reasonably reduce the number of feature points to be grouped (consolidated), to enhance the grouping (consolidation) efficiency, and to improve the grouping (consolidation) accuracy.

An integral image will be described below with reference to Part (A) of FIG. 14, Part (B) of FIG. 14, and Part (C) of FIG. 14.

Part (A) of FIG. 14 is a diagram illustrating an example of an original image.

In this example, an intensity image 2001 is shown as the original image.

In the intensity image 2001, an intensity value at a pixel position (x, y) is defined as i(x, y), where the transverse (horizontal) direction is defined as the x axis and the longitudinal (vertical) direction is defined as the y axis.

Part (B) of FIG. 14 is a diagram illustrating a result of a cumulative row addition.

In this example, integration is repeatedly performed from the left-top to the right-bottom of a frame.

In the cumulative row addition result 2002, a cumulative row addition value s(x, y) of a pixel position (x, y) is expressed by Equation (5).

$$s(x,y)=s(x,y-1)+i(x,y) \quad (5)$$

Part (C) of FIG. 14 is a diagram illustrating an example of an integral image.

In this example, integration is repeatedly performed from the left-top to the right-bottom in a frame.

In the integral image 2003, an integral value ii(x, y) of a pixel position (x, y) is expressed by Equation (6).

$$ii(x,y)=ii(x-1,y)+s(x,y) \quad (6)$$

The Haar-like feature value will be described below with reference to Part (A) of FIG. 15 and Part (B) of FIG. 15.

Part (A) of FIG. 15 shows a two-rectangle 2011.

A difference between left and right rectangular feature values is used as the feature of the two-rectangle 2011.

Part (B) of FIG. 15 shows a method of calculating the two-rectangle feature. In this example, the integrated value of a partial area is calculated from the integral image.

Here, a, b, c, d, e, and f are defined as integral gradient values at the points.

The single-rectangle feature value of the right region (region 1) is expressed by Expression (7) and can be calculated at four points.

The single-rectangle feature value of the left region (region 2) is expressed by Expression (8) and can be calculated at four points.

The two-rectangle feature value which is the difference between the feature value of region 1 and the feature value of region 2 is expressed by Equation (9) and can be calculated at six points.

$$f+b-(c+e) \quad (7)$$

$$e+a-(b+d) \quad (8)$$

$$e+a-(b+d)-(f+b-(c+e))=a+2e+c-2b-f-d \quad (9)$$

An integral histogram (gradient integral histogram) is known as an application of the integral image.

Specifically, integration is performed on the gradient image for each gradient direction.

Accordingly, a histogram in the unit of cells can be easily created.

An example where a gradient direction and a gradient magnitude are calculated will be described with reference to Part (A) of FIG. 16 to Part (D) of FIG. 16.

Part (A) of FIG. 16 is a diagram illustrating an example of an intensity image.

In this example, the pixel position in the x axis in the transverse (horizontal) direction is defined as u, and the coordinate value increases toward the right side. The pixel position in the y axis in the longitudinal (vertical) direction is defined as v, and the coordinate value increases toward the bottom.

The pixel position in the plane of x-y orthogonal coordinates is defined as a coordinate (u, v).

Part (B) of FIG. 16 shows an expression illustrating an example of a gradient.

In this example, the intensity at the pixel position of a coordinate (u, v) is defined as I(u, v).

The gradient of intensity in the transverse (horizontal) direction at the pixel position of a coordinate (u, v) is defined as Ix, and Ix is expressed by Equation (10). The gradient of intensity in the longitudinal (vertical) direction at the pixel position of a coordinate (u, v) is defined as Iy, and Iy is expressed by Equation (11).

$$I_x=I(u+1,v)-I(u-1,v) \quad (10)$$

$$I_y=I(u,v+1)-I(u,v-1) \quad (11)$$

Part (C) of FIG. 16 shows an expression illustrating an example of a gradient magnitude.

In this example, the gradient magnitude at the pixel position of a coordinate (u, v) is defined as m(u, v), and m(u, v) is expressed by Equation (12).

Part (D) of FIG. 16 shows an expression illustrating an example of a gradient direction.

In this example, the gradient direction at the pixel position of a coordinate (u, v) is defined as θ(u, v), and θ(u, v) is expressed by Equation (13).

$$m(u, v) = \sqrt{Ix^2 + Iy^2} \tag{12}$$

$$\theta(u, v) = \tan^{-1}\left(\frac{Iy}{Ix}\right) \tag{13}$$

Here, the gradient of intensity in an image corresponds to a differential image. For example, linkage of pixel positions at which the gradient of intensity is larger than a predetermined threshold value can be detected as a gradient.

Other techniques such as a technique using a Sobel filter may be used as the technique of calculating a gradient.

The integral gradient image is often used, for example, to calculate the HOG feature values.

The HOG feature value will be described below with reference to Part (A) of FIG. 17 and Part (B) of FIG. 17.

Part (A) of FIG. 17 shows an example of conversion into a histogram using cells.

Cells 2021 and a block 2022 including nine cells in total of 3×3, which are set in an image, are shown.

In this example, each cell includes five pixels (5 pixels) in the transverse (horizontal) direction and five pixels (5 pixels) in the longitudinal direction (vertical direction).

An intensity gradient distribution 2023 in the unit of cells is shown for each cell 2021. In this regard, a gradient direction histogram in which the horizontal axis represents the direction and the vertical axis represents the gradient magnitude is shown with nine directions as examples.

In this example, the intensity gradients in the cells are normalized in the unit of block 2022.

Part (B) of FIG. 17 shows an example where the HOG feature value normalized by the block region is calculated.

With nine directions as examples, a feature vector $F_{j,k}$ of a single cell 2031 is expressed by Equation (14). The components f of the feature vector in the directions (direction 1 to direction 9) are defined as $f_1$ to $f_9$, respectively. Here, k represents the position in the transverse (horizontal) direction of a cell and j represents the position in the longitudinal (vertical) direction.

The feature vector V of the block 2032 is expressed by Equation (15).

The normalization result v using the magnitude of the feature vector V is expressed by Equation (16).

In this example, the HOG feature vector has 9 cells×9 dimensions×4 blocks=324 dimensions.

$$F_{j,k} = [f_1, f_2, f_3, f_4, f_5, f_6, f_7, f_8, f_9] \tag{14}$$

$$V = [F_{j,k}, F_{j,k+1}, F_{j,k+2}, F_{j+1,k}, F_{j+1,k+1}, F_{j+1,k+2}, F_{j+2,k}, F_{j+2,k+1}, F_{j+2,k+2}] \tag{15}$$

$$v = \frac{f}{\sqrt{\|V\|^2 + \varepsilon^2}} \quad (\varepsilon = 1) \tag{16}$$

As described above, the object recognition unit 13 of the camera ECU (an example of the image recognition device) in the image recognition system according to this embodiment calculates the image coordinates (x, y) of feature points (for example, multiple feature points) in an acquired image, transforms the calculated image coordinates (x, y) of the feature points to coordinates (X, Y, Z) in a three-dimensional spatial coordinate system (for example, a camera coordinate system), and estimates a raster scan region based on the coordinates (X, Y, Z) in the three-dimensional spatial coordinate system. The object recognition unit 13 according to this embodiment performs pattern recognition on the raster scan region determined through the estimation to recognize a target object.

The object recognition unit 13 may estimate the raster scan region, for example, based on the image coordinates (x, y) of feature points and the coordinates (X, Y, Z) in the three-dimensional spatial coordinate system.

In a configuration example, the object recognition unit 13 according to this embodiment groups (combines) virtual windows based on the information of the distances Z of multiple feature points in the three-dimensional spatial coordinate system and the information on the positions X and Y or the image coordinates (x, y) of the feature points, and creates the raster scan region to be estimated.

In a configuration example, the object recognition unit 13 according to this embodiment determines a region of a virtual window (grouped window) obtained as the final result of grouping (consolidation) of the virtual windows as the raster scan region.

In a configuration example, the object recognition unit 13 according to this embodiment performs the grouping (consolidation) using a relational expression (conditional expression) based on the sizes (for example, the virtual window widths) of the virtual windows at the image coordinates (x, y) transformed based on the information of the distances Z of multiple feature points in the three-dimensional spatial coordinate system and the values of the image coordinates (x, y) of the feature points at the time of grouping (consolidation of) the virtual windows.

In a configuration example, the object recognition unit 13 according to this embodiment extends the outermost shell overlapping with the region of the corresponding virtual window to a wider area, when the relational expression (conditional expression) is established at the time of grouping (consolidation of) the virtual windows.

In a configuration example, the object recognition unit 13 according to this embodiment uses the step width (moving step) defined by the sizes (for example, window widths) of the virtual windows serving as a basis of the grouped window which is the final result of the grouping (consolidation) as the step width (moving step) at the time of performing a raster scan in the estimated raster scan region.

In a configuration example, the object recognition unit 13 according to this embodiment uses the scale defined by the sizes (for example, window widths) of the virtual windows serving as a basis of the grouped window which is the final result of the grouping (consolidation) as the scale at the time of performing a raster scan in the estimated raster scan region.

In a configuration example, the object recognition unit 13 according to this embodiment excludes the feature points located at such high or low positions at which a target object is not present from the feature points used in the process of estimating a raster scan region, based on the information (for example, the information of the Y value) on the height at the coordinates (X, Y, Z) in the three-dimensional spatial coordinate system to which the image coordinates (x, y) of the feature points are transformed.

In this manner, in the object recognition unit 13 of the camera ECU (an example of the image recognition device) in the image recognition system according to this embodiment, it is possible to reduce the number of windows unnecessary for the raster scan and to shorten the processing time of the pattern recognition, by using the information from the 3D analysis (or performing a part of the 3D analysis process).

In a configuration example, the object recognition unit 13 according to this embodiment can select (determine) the optimal step width (moving step) range and the optimal scale range for each group (grouped window) and it is thus possible to reduce the number of windows to be raster-scanned, compared with the conventional raster scan.

A lot of feature points extracted through the 3D analysis are also present at positions other than a target object. However, even when such feature points are included, it is possible to reduce the number of windows to be raster-scanned through the use of the raster scan according to this embodiment, compared with the conventional raster scan.

In the object recognition unit 13 according to this embodiment, even when the accuracy of transforming the image coordinates (x, y) to the coordinates (for example, the camera coordinates (X, Y, Z)) in the three-dimensional spatial coordinate system is not high, the number of windows to be raster-scanned can be reduced in comparison with the conventional raster scan, which is effective.

In this case, it is preferable that the grouping (consolidation) conditions described with reference to FIGS. 8 and 9 be alleviated, that is, that the threshold values be set to be alleviated.

Specific examples of the method of setting the threshold values to be alleviated include a method of setting the threshold value TH1 to be smaller or a method of setting the threshold value TH2 to be larger in the process of step S303 shown in FIG. 9.

As described above, by employing the object recognition unit 13 of the camera ECU (an example of the image recognition device) 1 in the image recognition system according to this embodiment, it is possible to achieve enhancement in image recognition efficiency.

The object recognition unit 13 of the camera ECU (an example of the image recognition device) 1 in the image recognition system according to this embodiment can be mounted on (installed in), for example, an on-board system.

By employing the object recognition unit 13 of the camera ECU (an example of the image recognition device) 1 in the image recognition system according to this embodiment in this manner, for example, since the operation processing speed is obtained enough to mount (install) the image recognition device on (in) an on-board system while maintaining identification performance, an adaptive cruise control (ACC) system, a forward collision warning (FCW) system, a pedestrian collision warning system, and the like can be applied using a single device.

According to this embodiment, it is possible to provide a device, a method, and a computer program which are suitable for recognizing a target object.

Configuration Examples of Embodiment

Configuration Example 1

An image recognition device (the camera ECU 1 in this embodiment) includes: an image acquiring unit 12 configured to acquire an image; and an object recognition unit 13 configured to extract feature points from the image acquired by the image acquiring unit 12, to detect coordinates of the extracted feature points in a three-dimensional spatial coordinate system (to perform conversion to the coordinates in this embodiment), and to determine a raster scan region which is used to recognize a target object based on the detection result.

Configuration Example 2

In the image recognition device, the object recognition unit 13 creates virtual windows based on information on distances (the distance Z in this embodiment) at the coordinates (the camera coordinates (X, Y, Z) in this embodiment) in the three-dimensional spatial coordinate system detected for the extracted feature points and information on positions (X and Y in this embodiment) other than the distances of the extracted feature points, combines the created virtual windows, and prepares a raster scan region.

Configuration Example 3

In the image recognition device, the object recognition unit 13 determines a region of a virtual window (grouped window), which is obtained as the final consolidation result of the virtual windows, as the raster scan region.

Configuration Example 4

In the image recognition device, the object recognition unit 13 sets sizes of the virtual windows based on the information on the distances in the three-dimensional spatial coordinate system detected for the extracted feature points, sets the positions of the virtual windows based on the information on the positions other than the distances of the extracted feature points, and combines the virtual windows of which the sizes and the positions have been set using a predetermined conditional expression (the conditional expressions, Equation (2) and Equation (3), in the flowchart shown in FIG. 9 in this embodiment).

Configuration Example 5

In the image recognition device, the object recognition unit 13 combines two virtual windows into a new virtual window when the relationship between the two virtual windows satisfies the conditions of the conditional expression at the time of combination of the virtual windows.

Configuration Example 6

In the image recognition device, the object recognition unit 13 determines a moving step of a raster scan based on the window width of each virtual window serving as a basis of the virtual window (grouped window) which is obtained as the final consolidation result of the virtual windows.

Configuration Example 7

In the image recognition device, the object recognition unit 13 determines a window scale to be used for a raster scan based on the window width of each virtual window serving as a basis of the virtual window (grouped window) which is obtained as the final consolidation result of the virtual windows.

Configuration Example 8

In the image recognition device, the object recognition unit 13 excludes a feature point, of which information on the height satisfies a predetermined condition, from candidates used to determine the raster scan region based on the information on heights (Y representing the height in this embodiment) in the three-dimensional spatial coordinate system detected from the extracted feature points.

Programs for realizing the functions of the processes that are performed by any of the constructive units shown in FIG. 1 may be recorded on a computer-readable recording medium and the programs recorded on the recording medium may be read and executed by a computer system to perform the processes. The "computer system" includes an OS (Operating System) and hardware such as peripherals. The "computer system" also includes a WWW system having a homepage provision environment (or display environment). The "computer-readable recording medium" includes a portable medium such as a flexible disc, a magneto-optical disc, a ROM, or a CD-ROM or a storage device such as a hard disk built in the computer system. The "computer-readable recording medium" also includes a device storing a program for a predetermined time, like an internal volatile memory (RAM (Random Access Memory)) of a computer system serving as a server or a client when the programs are transmitted through a network such as the Internet or a communication line such as a telephone line.

The above programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

In addition, not being limited to the above description, it is possible to realize the processes that are performed by any of the constructive units shown in FIG. 1 by using devices such as an FPGA (Field Program Gate Array), a DSP (Digital Signal Processor), or the like other than a micro-computer.

While the embodiments of the invention have been described with reference to the accompanying drawings, the specific constitutions are not limited to the embodiments, and may include other designs which do not depart from the concept of the invention.

What is claimed is:

1. An image recognition device comprising:
an image acquirer configured to acquire an image; and
an object recognizer configured to extract a plurality of feature points from the image acquired by the image acquirer, to detect coordinates of the plurality of extracted feature points in a three-dimensional spatial coordinate system, and to determine a raster scan region which is used to recognize a target object based on the coordinates of the extracted feature points; wherein
the object recognizer is further configured to create the raster scan region based on at least information on distances between the image acquirer and the plurality of extracted feature points using the coordinates thereof;
the object recognizer is configured to create the raster scan region based on information on positions of the plurality of extracted feature points other than the distances between the image acquirer and the plurality of extracted feature points, the information on positions of the plurality of extracted feature points being calculated using the coordinates;
the object recognizer is configured to refer to a difference between the information of positions of the two or more preliminary windows and a difference between sizes of the two or more preliminary windows, and to consolidate the two or more preliminary windows to generate the raster scan region using a predetermined conditional expression; and
the object recognizer is configured to set sizes of the preliminary windows based on the information on the distances, to set the positions of the preliminary windows based on the information on the positions other than the distances of the extracted feature points, and to consolidate the preliminary windows of which the sizes and the positions have been set using the predetermined conditional expression.

* * * * *